(12) United States Patent
Kobayashi

(10) Patent No.: US 11,164,286 B2
(45) Date of Patent: Nov. 2, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Masaaki Kobayashi, Chofu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 197 days.

(21) Appl. No.: 16/460,358

(22) Filed: Jul. 2, 2019

(65) Prior Publication Data

US 2020/0013142 A1 Jan. 9, 2020

(30) Foreign Application Priority Data

Jul. 9, 2018 (JP) .............................. JP2018-130071

(51) Int. Cl.
| | | |
|---|---|---|
| *G06K 9/00* | (2006.01) | |
| *G09G 5/00* | (2006.01) | |
| *G06T 3/40* | (2006.01) | |
| *G06T 7/246* | (2017.01) | |
| *G06T 7/73* | (2017.01) | |

(52) U.S. Cl.
CPC ............... *G06T 3/40* (2013.01); *G06T 7/248* (2017.01); *G06T 7/74* (2017.01); *G06T 2207/10004* (2013.01); *G06T 2207/10016* (2013.01); *G06T 2207/30204* (2013.01)

(58) Field of Classification Search
USPC ................ 382/100, 103, 106–107, 123, 162, 382/172–173, 180–181, 199, 209, 219, 382/224, 232, 254, 264, 274, 276, 291, 382/305, 197, 298, 321; 348/223.1; 345/660
See application file for complete search history.

(56) References Cited

U.S. PATENT DOCUMENTS

| | | | | |
|---|---|---|---|---|
| 2003/0095723 | A1* | 5/2003 | Ishizaka | ................ G06T 3/4007 382/298 |
| 2010/0134518 | A1* | 6/2010 | Moriya | ................ H04N 1/4092 345/660 |
| 2011/0091113 | A1* | 4/2011 | Ito | ...................... G06K 9/00315 382/197 |

(Continued)

OTHER PUBLICATIONS

Bruce D. Lucas, et al.; "An Iterative Image Registration Technique with an Application to Stereo Vsion;" Proceedings of Imaging Understanding Workshop, Apr. 1981, pp. 121-130.

(Continued)

*Primary Examiner* — Seyed H Azarian
(74) *Attorney, Agent, or Firm* — Canon U.S.A., Inc. IP Division

(57) ABSTRACT

An apparatus includes an acquisition unit configured to acquire an input image and a reference image, a region enlargement unit configured to perform, on each of the input image and the reference image, a region enlargement process for widening a region including pixels that satisfy a predetermined condition, and a detection unit configured to detect a corresponding point in the reference image subjected to the region enlargement process, the corresponding point corresponding to a pixel of interest in the input image subjected to the region enlargement process.

19 Claims, 11 Drawing Sheets

(56) References Cited

U.S. PATENT DOCUMENTS

| | | | |
|---|---|---|---|
| 2013/0076937 A1* | 3/2013 | Tajima | H04N 5/2355 348/223.1 |
| 2017/0213319 A1* | 7/2017 | Kurihara | H04N 1/40068 |
| 2018/0144485 A1* | 5/2018 | Kobayashi | G06T 7/13 |

OTHER PUBLICATIONS

Jean-Yves Bouguet; "Pyramidal Implementation of the Lucas Kanade Feature Tracker Description of the algorithm;" http://robots.stanford.edu/cs223b04/algo_tracking.pdf; pp. 1-9.

\* cited by examiner

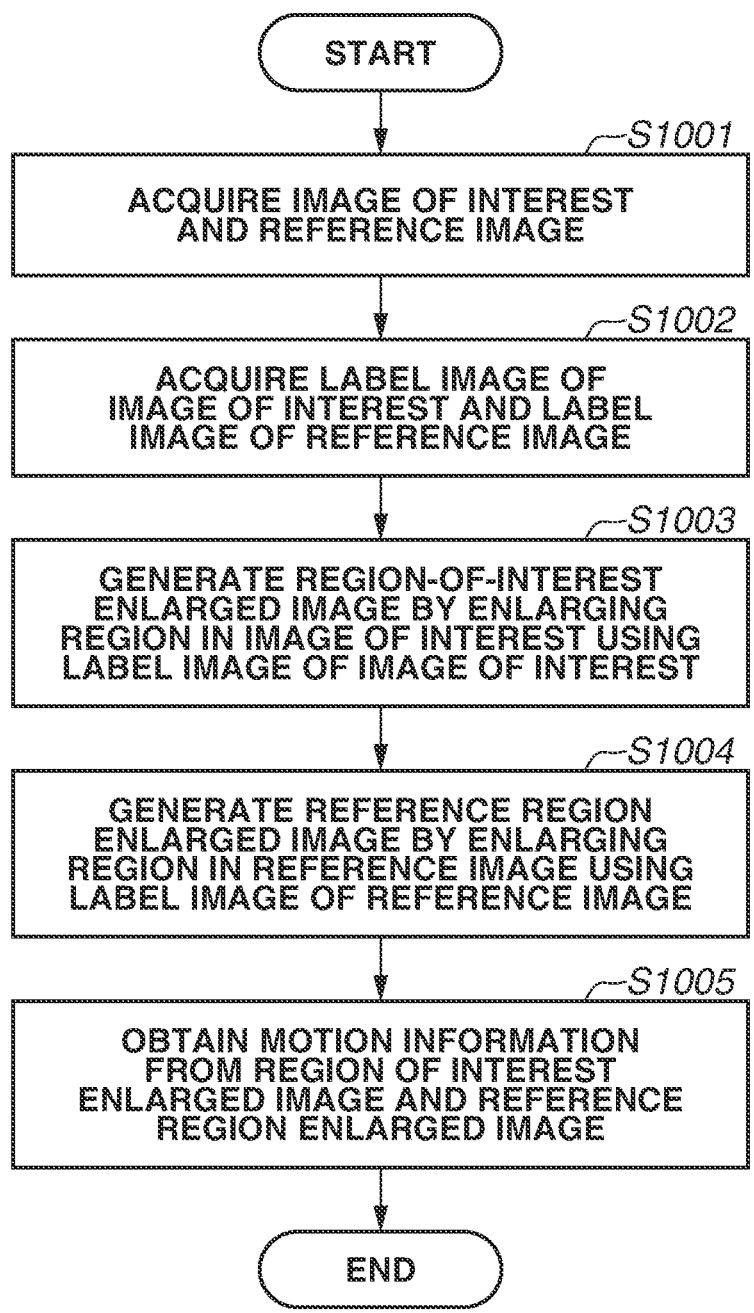

FIG.11A
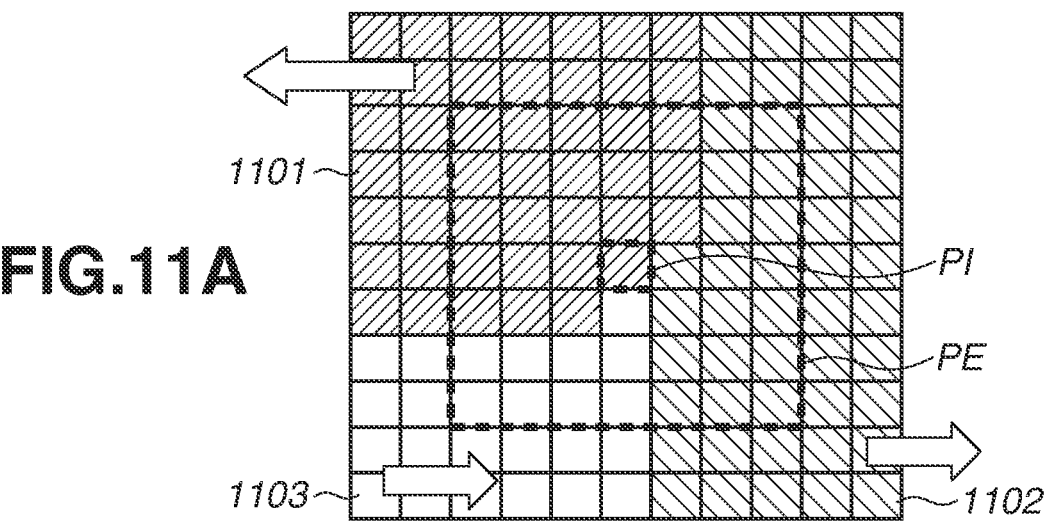
FIG.11B
| 0 | 0 | 0 | 0 | 0 | 0 | 0 | 1 | 1 | 1 | 1 |
| 0 | 0 | 0 | 0 | 0 | 0 | 0 | 1 | 1 | 1 | 1 |
| 0 | 0 | 0 | 0 | 0 | 0 | 0 | 1 | 1 | 1 | 1 |
| 0 | 0 | 0 | 0 | 0 | 0 | 0 | 1 | 1 | 1 | 1 |
| 0 | 0 | 0 | 0 | 0 | 0 | 0 | 1 | 1 | 1 | 1 |
| 0 | 0 | 0 | 0 | 0 | 0 | 1 | 1 | 1 | 1 | 1 |
| 0 | 0 | 0 | 0 | 0 | 1 | 1 | 1 | 1 | 1 | 1 |
| 1 | 1 | 1 | 1 | 1 | 1 | 1 | 1 | 1 | 1 | 1 |
| 1 | 1 | 1 | 1 | 1 | 1 | 1 | 1 | 1 | 1 | 1 |
| 1 | 1 | 1 | 1 | 1 | 1 | 1 | 1 | 1 | 1 | 1 |
| 1 | 1 | 1 | 1 | 1 | 1 | 1 | 1 | 1 | 1 | 1 |
FIG.11C
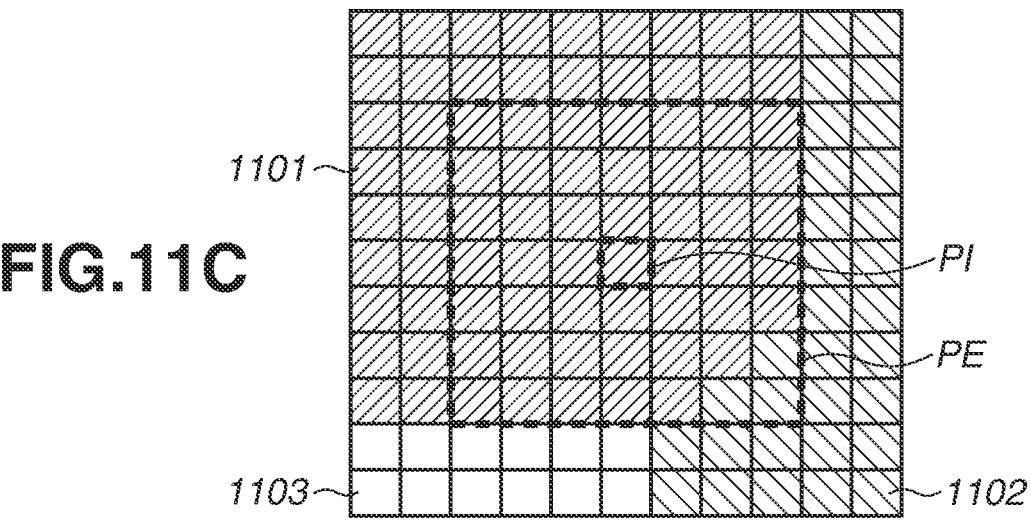

IMAGE PROCESSING APPARATUS, IMAGE PROCESSING METHOD, AND STORAGE MEDIUM

BACKGROUND OF THE INVENTION

Field of the Invention

The aspect of the embodiments relates to an image processing technique for associating pixels between images.

Description of the Related Art

In recent years, techniques for associating pixels between images have been increasing in importance. The association between pixels is the relationship between a pixel in an image of interest and a pixel in a reference image regarded as the same as the pixel in the image of interest and can be represented by the coordinates of two points. For example, in a case where a stereo image or a multi-view image is used, the depth of an object can be calculated from the correspondence relationship between pixels. Thus, the association between pixels can also be applied to three-dimensional image processing. In a case where continuously captured images (a moving image) are used, the correspondence relationship between the images is represented as relative coordinates, thereby obtaining a motion vector from the relative coordinates. The generation of a motion vector in this way is referred to as "motion detection". A set of motion vectors obtained by performing motion detection at a plurality of pixels is termed an optical flow (in a narrow sense, information with a motion vector corresponding to a pixel being mapped is referred to as an "optical flow"). Using the optical flow enables tracking of a moving body, stabilization of a moving image, or interpolation of frames.

Typical techniques for acquiring an optical flow includes a gradient method and a template matching method. In the gradient method, from the direction and the magnitude of a temporal-spatial change in the luminance of a pixel, an optical flow is calculated. In a basic gradient method, a motion vector is calculated based on the average of temporal-spatial changes in the luminances of pixels in a patch region (a region of interest) including a plurality of pixels centered on a pixel of interest. Typical method therefor includes the Lucas-Kanade method (hereinafter, the "LK method"; see B. D. Lucas and T. Kanade (1981), "An Iterative Image Registration Technique With An Application To Stereo Vision", Proceedings of Imaging Understanding Workshop, pages 121-130). In the LK method, image correlation in a patch region before and after a movement is represented by the sum of squared differences (SSD). The SSD is subjected to Taylor expansion, and an equation that derives the smallest SSD, i.e., the amount of movement having the highest correlation, is solved. This amount of movement is the motion vector of the pixel of interest. The motion vector of each pixel is then calculated while the pixel of interest is scanned, thereby generating an optical flow. In the gradient method, the magnitude of a motion that can be detected is small. Thus, generally, an optical flow is detected using a hierarchy image (a so-called image pyramid) including a plurality of reduced-size images. The motion vector of an optical flow calculated based on a reduced-size image is used as the initial value of motion detection at a pixel in an image one level larger than the reduced-size image. Thus, a large motion is detected in a reduced-size image, while a difference in the motion detected in the reduced-size image, i.e., a motion with higher accuracy, can be detected in a larger-size image. Typical technique therefor includes a technique discussed in Pyramidal Implementation of the Lucas Kanade Feature Tracker Description of the algorithm Jean-Yves Bouguet [retrieved on Jun. 14, 2018], the Internet <URL:http://robots.stanford.edu/cs223b04/algo_tracking.pdf>.

In the template matching method, for a region of interest, a plurality of patch regions (reference regions) is set at various positions on a reference image. The correlations among the region of interest and the reference regions are calculated, and the relative position of a reference region having the highest correlation is detected as a motion vector. This is termed a motion search. The motion search is performed while a pixel of interest is being scanned, and the motion vector of each pixel is calculated, thereby generating an optical flow. In general template matching, the SSD or the sum of absolute differences (SAD) is often used to calculate a correlation value. In order to limit the motion search range, image pyramids can be used also in template matching. In such a case, the motion vector of an optical flow calculated based on a reduced-size image is used as a search initial point for a motion search at a pixel in an image one level larger than the reduced-size image.

In a case where a motion in a patch region centered on a pixel of interest is detected, and if the patch region extends over the boundary of an object region where there is a motion, regions including different motions are present in the patch region. Thus, a motion in the patch region cannot be uniquely determined, and the accuracy of motion detection decreases.

SUMMARY OF THE INVENTION

According to an aspect of the embodiments, an apparatus includes an acquisition unit configured to acquire an input image and a reference image, a region enlargement unit configured to perform, on each of the input image and the reference image, a region enlargement process for widening a region including pixels that satisfy a predetermined condition, and a detection unit configured to detect a corresponding point in the reference image subjected to the region enlargement process. The corresponding point corresponds to a pixel of interest in the input image subjected to the region enlargement process.

Further features of the disclosure will become apparent from the following description of exemplary embodiments with reference to the attached drawings.

BRIEF DESCRIPTION OF THE DRAWINGS

FIG. 10 is a flowchart of a motion detection process using a label image.

FIGS. 11A, 11B, and 11C are diagrams illustrating enlargement of a region using a label image.

DESCRIPTION OF THE EMBODIMENTS

With reference to the drawings, exemplary embodiments of the disclosure will be described below.

Figure 1:
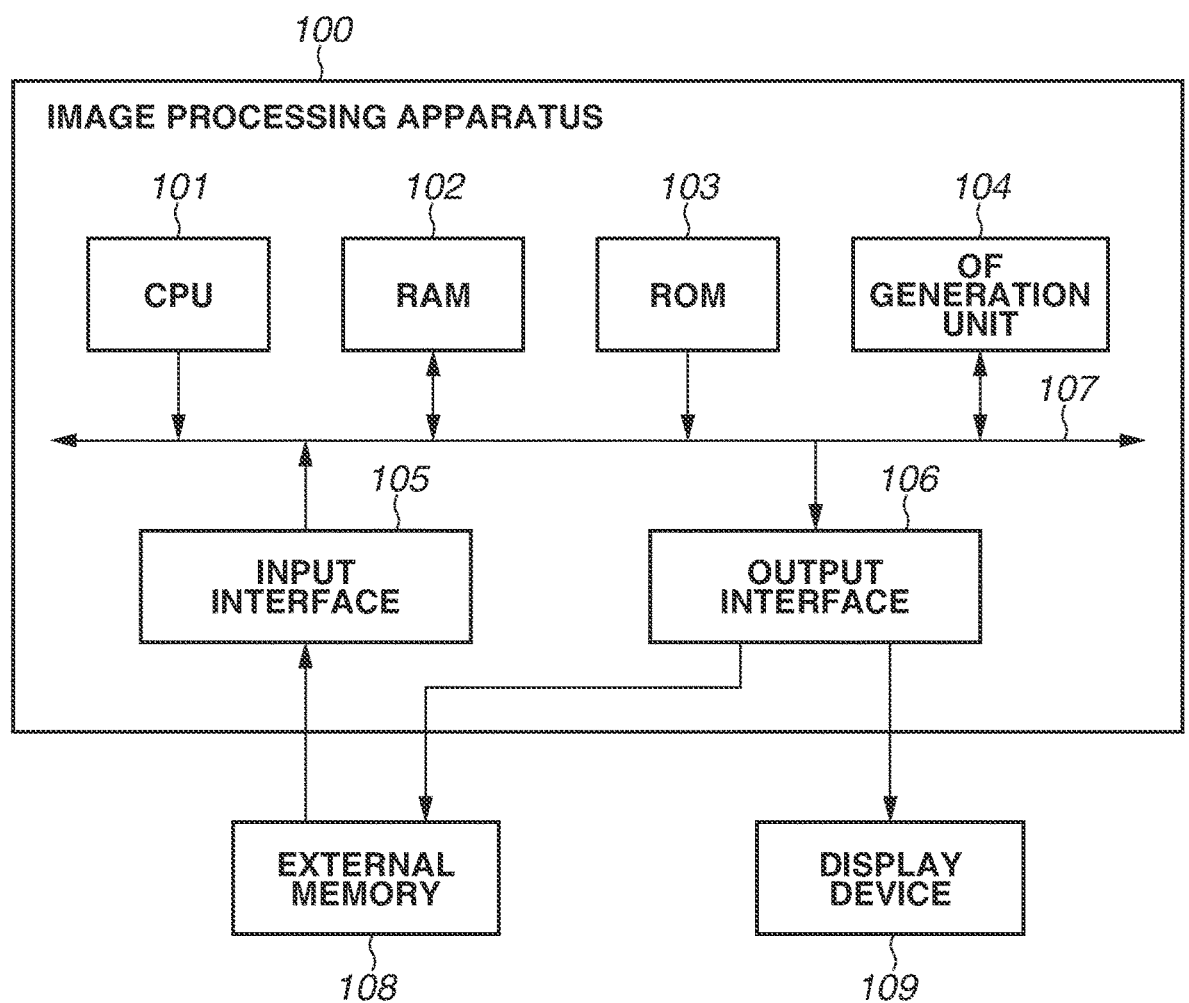
FIG. 1 is a diagram illustrating an example of a general configuration of an image processing apparatus according to an exemplary embodiment.

In a first exemplary embodiment, a description will be provided of a method for generating an optical flow of a main object. FIG. 1 is a diagram illustrating an example of the general configuration of an image processing apparatus according to the first exemplary embodiment.

An image processing apparatus 100 includes a central processing unit (CPU) 101, a random-access memory (RAM) 102, a read-only memory (ROM) 103, an optical flow (OF) generation unit 104, an input interface 105, an output interface 106, and a system bus 107. An external memory 108 includes, for example, a hard disk, a memory card, a CompactFlash (registered trademark) (CF) card, a Secure Digital (SD) card, or a Universal Serial Bus (USB) memory and is connected to the input interface 105 and the output interface 106. A display device 109 is an image display device, such as a liquid crystal display, and is connected to the output interface 106.

The CPU 101 is a processor that performs overall control of the components of the image processing apparatus 100. The RAM 102 is a memory that functions as a main memory or a work area for the CPU 101. The ROM 103 stores, for example, programs to be used in processing in the image processing apparatus 100. The CPU 101 executes the programs stored in the ROM 103, using the RAM 102 as a work area, thereby implementing various processes and various types of control described below. Additionally, the image processing apparatus 100 may also include a large-capacity storage unit (not illustrated). The large-capacity storage unit stores image data to be used in processing in the image processing apparatus 100 and parameters for the processing. As the large-capacity storage unit, a hard disk drive (HDD), an optical disc drive, or a flash memory can be used.

The OF generation unit 104 detects a motion vector and generates an optical flow. A description will be provided below of the details of the process of detecting a motion vector and the process of generating an optical flow that are performed by the OF generation unit 104. The OF generation unit 104 may be implemented with a hardware configuration, such as a circuit configuration, or may be implemented with a software configuration by using, for example, a CPU executing a program. Alternatively, a part of the OF generation unit 104 may be implemented with a hardware configuration, and the rest of the OF generation unit 104 may be implemented with a software configuration.

The input interface 105 is a serial bus interface, such as USB, based on, for example, USB, the Institute of Electrical and Electronics Engineers (IEEE) 1394, or Serial AT Attachment (SATA). The image processing apparatus 100 can acquire image data as a processing target from the external memory 108 via the input interface 105. The output interface 106 is a video output terminal, such as a Digital Visual Interface (DVI) or a High-Definition Multimedia Interface (HDMI) (registered trademark). The image processing apparatus 100 can output processed image data to the display device 109 via the output interface 106. The image processing apparatus 100 also includes components other than those illustrated in FIG. 1, but these components are not illustrated or described.

Before the description of the detailed configuration and processing of the image processing apparatus 100 according to the present exemplary embodiment, terms and notations in the present exemplary embodiment are described.

In the present exemplary embodiment, a map obtained by mapping a motion vector corresponding to each pixel in an image is referred to as "optical flow". That is, the optical flow is data which has the same resolution as that of an input image and in which an element corresponding to each pixel is represented as a two-dimensional floating-point vector. In the image processing apparatus 100 according to the present exemplary embodiment, the OF generation unit 104 detects a motion vector corresponding to each pixel, thereby generating an optical flow. Further, when an image is represented as I, and coordinates p representing the position of a pixel in the image are (x,y), the OF generation unit 104 acquires the pixel value in the image as I(p) or I(x,y). The description will be provided on the assumption that a pixel is floating-point monochrome data where, for example, black is represented by 0 and white is represented by 1. The aspect of the embodiments, however, is not limited to this. A pixel may be, for example, 8-bit integer data. A motion vector included in an optical flow can also be similarly represented. That is, if an optical flow is represented as f, the motion vector of the coordinates p can be represented as f(p). Further, if a vertical component u of the optical flow is represented as $f_y$, and a horizontal component v of the optical flow is represented as $f_x$, the motion vector f(p) of the coordinates p can be represented as $f(p)=(f_x(p),f_y(p))$. In the above notations, if coordinate values are passed by using real numbers, a vector or a pixel value calculated by interpolation is obtained. As the interpolation method, for example, a bilinear interpolation method or a bicubic interpolation method can be used. In the present exemplary embodiment, either method can be used and the method is not limited.

Figure 2:
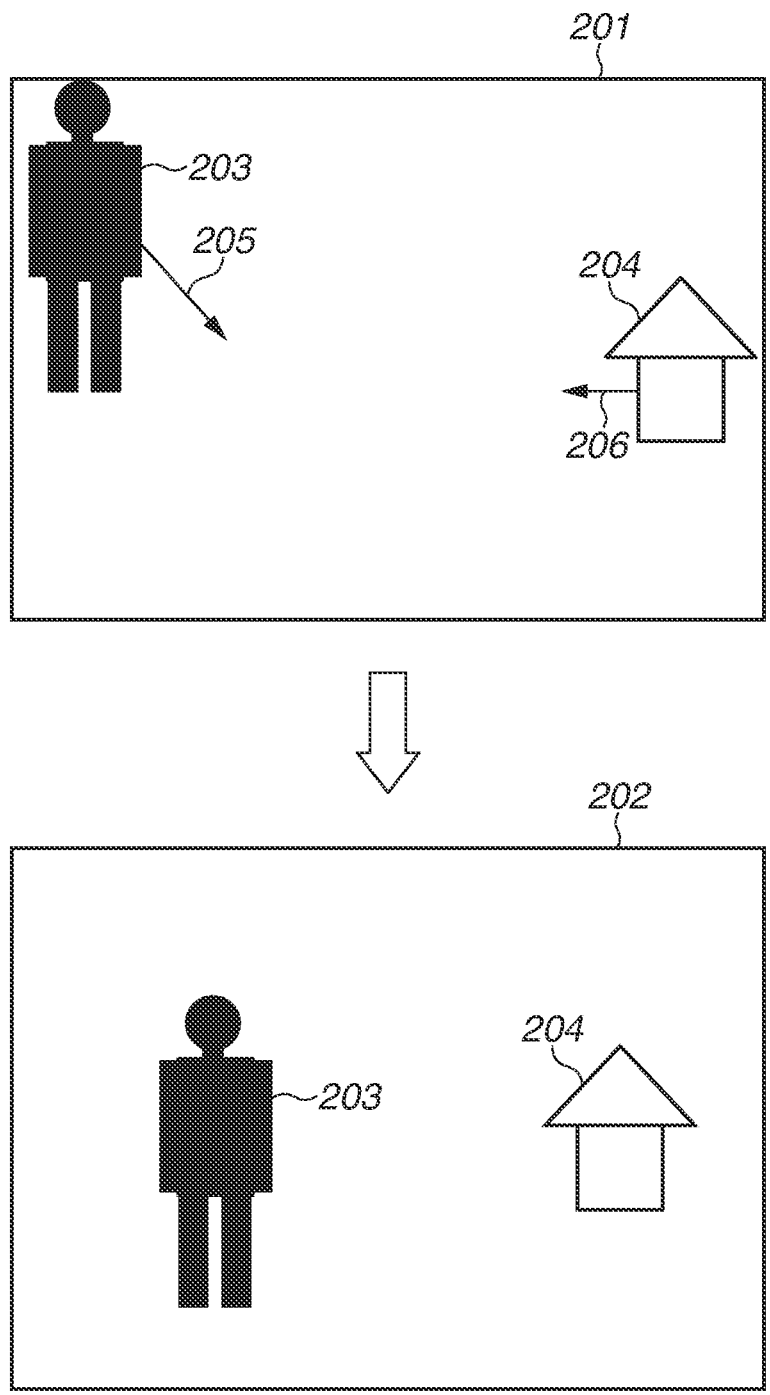
FIG. 2 is a diagram illustrating a concept of an optical flow.

Next, with reference to FIG. 2, the concept of an optical flow is described.

FIG. 2 illustrates examples of images assuming that a scene where a person 203 as a main object walks is captured while a camera is being moved. Images 201 and 202 in FIG. 2 illustrate two examples of images captured at different times with the camera being moved. If the image 201 is acquired at a certain time, the image 202 is acquired at a time after the image 201 is acquired. In the images 201 and 202, the person 203 as the main object and a house 204 as an example of another object appear. In one embodiment, the motion vectors of parts of the body of the person 203 are different from each other. In this example, these motion vectors are simplified, and the person 203 is assumed to be moving in the direction of a vector 205. Further, although the house 204 does not move in practice, assume that the house 204 is captured while the camera is being moved, whereby the house 204 appears as if constantly moving in the direction of a vector 206 in the images 201 and 202. Here, the motion vector for the person 203 is f(10,5), and the motion vector for the house 204 is f(−5,0). To simplify the description, the motion vector of the background is f(0,0). In this example, if the coordinates p of a pixel are included in the person 203, (u,v) of an optical flow based on the image 201 is (u(p),v(p))=(10,5). If the coordinates p of a pixel (u,v) of the optical flow are included in the house 204, (u(p),v(p))=(−5,0). If the coordinates p of a pixel (u,v) of the optical flow are included in the background, (u(p),v(p))=(0,0).

As described above, the description will be provided on the assumption that, the OF generation unit 104 according to the present exemplary embodiment generates an optical flow with an image of interest and a reference image as input. The image of interest and the reference image are captured at different times using a single camera. Alternatively, images captured at the same time or different times using different cameras may be input to the OF generation unit 104. In the case of the images captured at the same time using different cameras, it is also possible to calculate the depth of an object from an optical flow.

Figure 3A:
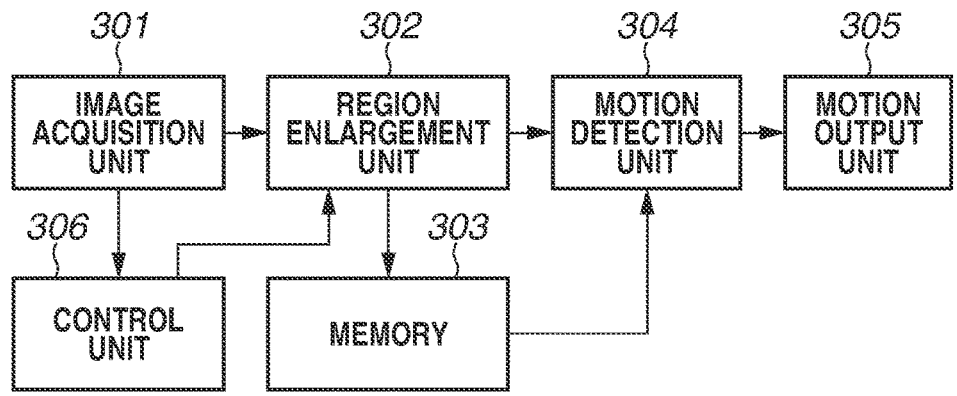
FIGS. 3A, 3B, and 3C are diagrams illustrating examples of configurations for performing motion detection.
Figure 4:
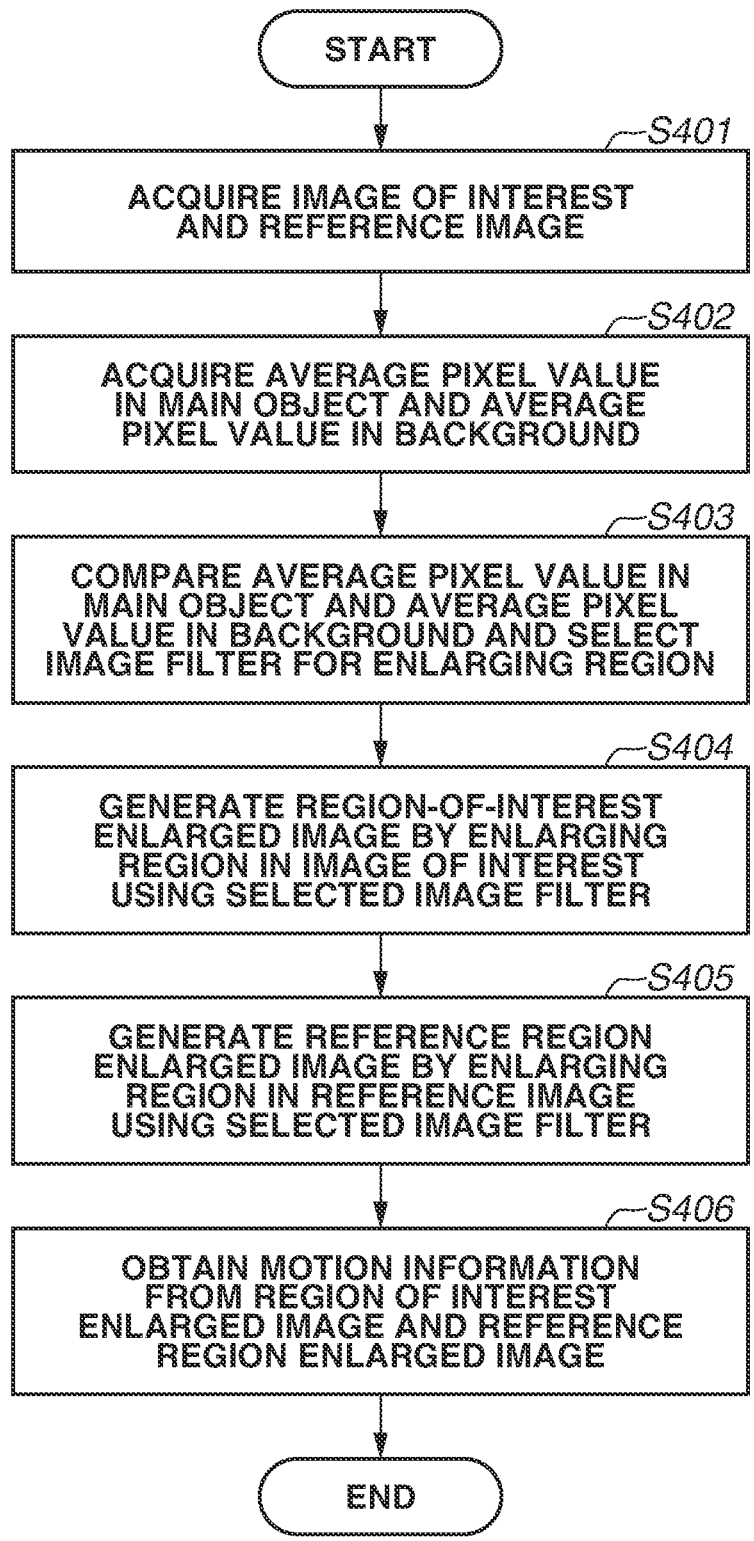
FIG. 4 is a flowchart of a motion detection process.

FIG. 3A illustrates a configuration example of the image processing apparatus 100 according to the first exemplary embodiment in a case where the process of detecting a motion vector and generating an optical flow is realized with, for example, a hardware configuration based on circuits in the image processing apparatus 100. FIG. 4 is a flowchart illustrating the flow of the process of detecting a motion vector and generating an optical flow executed by using a hardware configuration or a software configuration based on a program in the image processing apparatus 100 according to the first exemplary embodiment.

In FIG. 3A, a control unit 306 is included in, for example, the CPU 101. A memory 303 is included in, for example, the RAM 102. An image acquisition unit 301, a region enlargement unit 302, a motion detection unit 304, and a motion output unit 305 are included in, for example, the OF generation unit 104 and are each configured by a circuit.

The image acquisition unit 301 acquires an image of interest and a reference image. The processing of the image acquisition unit 301 corresponds to processing step S401 in FIG. 4 (described below).

Under control of the control unit 306, the region enlargement unit 302 performs the process of extracting a region including pixels that satisfy a predetermined condition from each of the image of interest and the reference image, and widening (expanding) the extracted region. Hereinafter, the process of extracting a region including pixels that satisfy the predetermined condition and widening (expanding) the extracted region will be referred to as a "region enlargement process". The region enlargement unit 302 then stores in the memory 303 the reference image having been subjected to the region enlargement process. The region enlargement process performed by the region enlargement unit 302 corresponds to processing steps S402 to S405 in FIG. 4 (described below). Alternatively, processing steps S402 and S403 in FIG. 4 may be performed by the control unit 306.

Using the image of interest having been subjected to the region enlargement process and the reference image that has been subjected to the region enlargement process and is stored in the memory 303, the motion detection unit 304 performs a motion detection process by searching the reference image for a corresponding point corresponding to a pixel of interest in the image of interest. The motion detection unit 304 then generates an optical flow obtained by mapping a motion vector corresponding to each pixel. The motion output unit 305 outputs information regarding the generated optical flow. The processing of the motion detection unit 304 and the motion output unit 305 corresponds to processing step S406 in FIG. 4 (described below).

With reference to the flowchart illustrated in FIG. 4, a description will be provided of the detailed flow of the process of detecting the motion of a main object, such as the person 203 in FIG. 2, and generating an optical flow obtained by mapping the motion with respect to each pixel, in the image processing apparatus 100 according to the first exemplary embodiment.

The description will be provided taking as an example a case where the processing of the flowchart in FIG. 4 is executed with a software configuration based on a program. Alternatively, the processing of the flowchart in FIG. 4 can also be executed with the configuration in FIG. 3A. The program regarding the processing of the flowchart in FIG. 4 is stored in, for example, the ROM 103, loaded into the RAM 102, and executed by the OF generation unit 104 including a CPU. The program may be not only prepared in advance in the ROM 103, but also acquired from a storage medium, such as the external memory 108 or acquired via a network (not illustrated). Further, unless otherwise specifically stated, data input to and output from the OF generation unit 104 is input from the RAM 102 and output to the RAM 102. Further, unless otherwise specifically stated, processes are executed in the order of processing steps illustrated in the flowchart in FIG. 4. However, in a case where processes do not have a dependent relationship with each other, the order of the processes is not limited to the processing order in FIG. 4. The same applies to other flowcharts.

First, in step S401, the OF generation unit 104 acquires an image of interest and a reference image. In the case of the configuration in FIG. 3A, the image acquisition unit 301 acquires the image of interest and the reference image.

Next, in step S402, the OF generation unit 104 acquires the average pixel value in a main object region and the average pixel value in a background region for each of the image of interest and the reference image. There is no limitation on the method for calculating the average pixel values for the main object region and the background region. For example, the image can be segmented into regions, a region present in the center of the screen can be regarded as a main object, and the average pixel value of pixels in the region can be calculated as the average pixel value in the main object region. The average pixel value of the background region can be obtained by calculating the average pixel value of pixels not present in the main object region. As a method for segmenting the image into regions, a mean shift method and a watershed method are widely known. Thus, the method is not described here. In the case of the configuration in FIG. 3A, for example, the region enlargement unit 302 acquires the average pixel values in the main object region and the background region. Alternatively, the control unit 306 may acquire the average pixel values in the main object region and the background region.

Next, in step S403, the OF generation unit 104 compares the average pixel value in the main object region and the average pixel value in the background region acquired in each of the image of interest and the reference image in step S402. Based on the result of the comparison, the OF generation unit 104 selects an image filter to be used in the region enlargement process. For example, if the main object region is relatively lighter than the background region, the OF generation unit 104 selects a maximum value filter as the image filter to be used in the region enlargement process. If the main object region is relatively darker than the background region, the OF generation unit 104 selects a minimum value filter. With the maximum value filter, the maximum pixel value in a local region of a predetermined size is extracted and the extracted maximum pixel value is set for the central pixel of the local region. Furthermore, with the minimum value filter, the minimum pixel value in a local region of a predetermined size is extracted and the extracted minimum pixel value is set for the central pixel of the local region. In the present exemplary embodiment, each of the maximum value filter and the minimum value filter is a filter of a 5-by-5 size. The effects of the filter processes will be described below. In the case of the configuration in FIG. 3A, for example, the region enlargement unit 302 compares the average pixel values in the main object region and the background region. Based on the result of the comparison, the region enlargement unit 302 selects either the maximum value filter or the minimum value filter. If the control unit 306 acquires the average pixel values of the main object region and the background region in step S402, the control unit 306 may compare the average pixel values, select the filter, and set the selected filter in the region enlargement unit 302.

Next, in step S404, using the image filter selected in step S403, the OF generation unit 104 performs the region enlargement process for widening (expanding) a region including pixels that satisfy a predetermined condition in the image of interest. For example, if the maximum value filter is selected because the main object region is relatively lighter than the background region in step S403, then in step S404, the OF generation unit 104 extracts the maximum pixel value in a local region as a pixel that satisfies the predetermined condition. The OF generation unit 104 then sets the extracted maximum pixel value for the central pixel of the local region. Consequently, the region enlargement process for widening the relatively light main object region is performed. If the minimum value filter is selected because the main object region is relatively darker than the background region in step S403, then in step S404, the OF generation unit 104 extracts the minimum pixel value in a local region as a pixel that satisfies the predetermined condition. The OF generation unit 104 then sets the extracted minimum pixel value for the central pixel of the local region. In this way, the region enlargement process for widening the relatively dark main object region is performed. Hereinafter, an image after all the pixels in the image of interest have been thus subjected to the filter process will be referred to as a "region-of-interest enlarged image". In the case of the configuration in FIG. 3A, the region enlargement unit 302 generates the region-of-interest enlarged image.

Further, in step S405, using the image filter selected in step S403, the OF generation unit 104 performs the region enlargement process for widening (expanding) a region including pixels that satisfy a predetermined condition in the reference image. As in step S404, for example, if the maximum value filter is selected because the main object region is relatively lighter than the background region in step S403, then in step S405, the OF generation unit 104 extracts the maximum pixel value in a local region as a pixel that satisfies the predetermined condition. The OF generation unit 104 then sets the extracted maximum pixel value for the central pixel of the local region. In this way, the region enlargement process for widening the relatively light main object region is performed. If the minimum value filter is selected because the main object region is relatively darker than the background region in step S403, then in step S405, the OF generation unit 104 extracts the minimum pixel value in a local region as a pixel that satisfies the predetermined condition. The OF generation unit 104 then sets the extracted minimum pixel value for the central pixel of the local region. In this way, the region enlargement process for widening the relatively dark main object region is performed. Hereinafter, an image after all the pixels in the reference image have been subjected to the filter process will be referred to as a "reference region enlarged image". In the case of the configuration in FIG. 3A, the region enlargement unit 302 generates the reference region enlarged image.

Next, in step S406, using the region-of-interest enlarged image and the reference region enlarged image, the OF generation unit 104 detects a motion vector, then generates information regarding an optical flow obtained by mapping a motion vector corresponding to each pixel, and outputs the generated information. For example, the OF generation unit 104 sets a patch region of 7×7 pixels centered on a pixel of interest in the region-of-interest enlarged image, searches for a patch region having the highest image correlation (e.g., having the lowest sum-of-absolute-differences (SAD) value) in the reference region enlarged image, and detects the relative position of the found patch region as a motion vector. The OF generation unit 104 scans the pixel of interest such that the pixel of interest is changed in order, thereby detecting motion vectors in the scanning order. The OF generation unit 104 then generates an optical flow in which the motion vectors detected for all the pixels are mapped. In a motion search, the OF generation unit 104 sets a pixel as a search initial point in the reference region enlarged image and searches for a patch region having the highest image correlation in a search range centered on the search initial point. In the present exemplary embodiment, the description will be provided on the assumption that the coordinates of the search initial point and the coordinates of the pixel of interest are the same as each other. The search range is a range of 15×15 pixels centered on the search initial point. There are no limitations on the size of a patch region and the search range. In the case of the configuration in FIG. 3A, the motion detection unit 304 detects the motion vector and generates the optical flow. The motion output unit 305 outputs the information regarding the optical flow. After the process of step S406, the processing of the flowchart in FIG. 4 in the OF generation unit 104 ends.

As described above, if a foreground object is relatively lighter than the background, the OF generation unit 104 selectively uses the maximum value filter, thereby widening (expanding) an object region while maintaining the contour shape of the foreground object. If, on the other hand, the foreground object is relatively darker than the background, the OF generation unit 104 selectively uses the minimum value filter, thereby widening (expanding) the object region while maintaining the contour shape of the foreground object. Thus, even if a patch region including a pixel of interest extends over the boundary of an object region where there is a motion, it is possible to uniquely determine a motion in the patch region and improve the accuracy of motion detection.

Figure 5A:
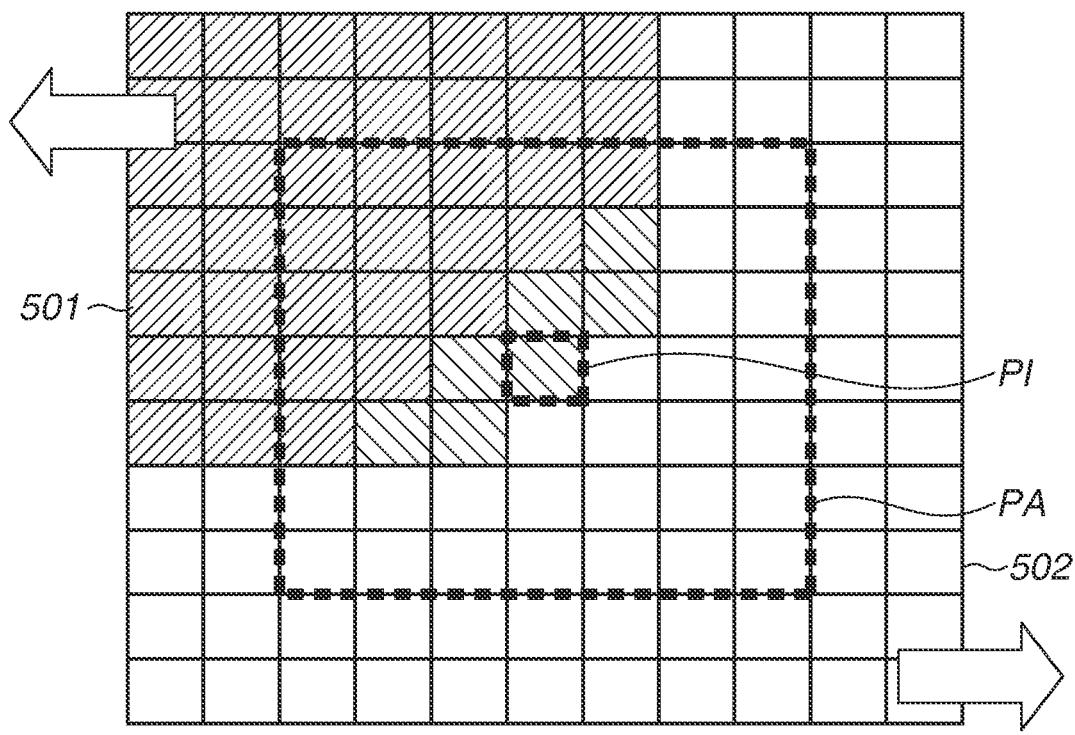
FIGS. 5A and 5B are diagrams schematically illustrating an example of enlargement of an image of a boundary portion.
Figure 5B:
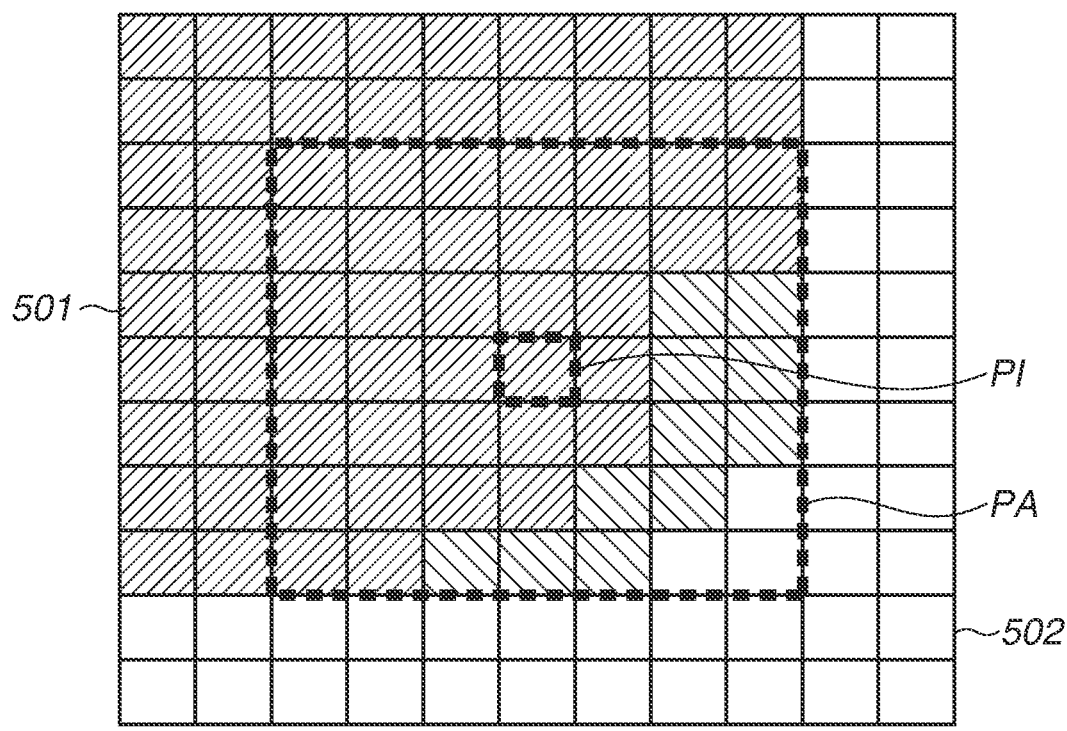

With reference to FIGS. 5A and 5B, the effects of using, for example, the minimum value filter are described more specifically.

FIGS. 5A and 5B are diagrams schematically illustrating an extracted part of a boundary portion between a foreground object and the background in an image of interest and illustrate examples of images in a case where the foreground object is relatively darker than the background. In FIGS. 5A and 5B, a region including dark pixels is a foreground object region 501, and a region including light pixels is a background region 502. In FIGS. 5A and 5B, a single square represents a single pixel, and the lightness of each pixel is represented by the number of oblique lines drawn in the pixel. For example, the greater the number of oblique lines, the darker the pixel. The smaller the number of oblique lines, the lighter the pixel. A pixel without oblique lines is a very light pixel. If the foreground object is relatively darker than the background as in this example, then in step S403, the minimum value filter is selected as the image filter. FIG. 5A illustrates an image before being subjected to the filter process (before the object region 501 is widened). FIG. 5B illustrates an example of an image after the region of the foreground object is widened (expanded) by the filter process using the minimum value filter. FIGS. 5A and 5B also illustrate examples of a pixel of interest PI when a motion is detected, and a patch region PA including 7×7 pixels centered on the pixel of interest PI. As illustrated in FIG. 5A, the foreground object region 501 moves leftward as indicated by a leftward arrow in a reference image. The background region 502 moves rightward as indicated by a rightward arrow. In this example, the foreground object region 501 in FIG. 5A as the reference image has the same shape as that in the image of interest. Thus, the shape of the foreground object region 501 obtained through application of the filter to the reference image is the same as that of the foreground object region 501 in FIG. 5B.

In this example, in setting the patch region PA composed of 7×7 pixels centered on the pixel of interest PI to the image before being subjected to the filter process illustrated in FIG. 5A, a boundary portion between the foreground object region 501 and the background region 502 is present in the patch region PA. Suppose that at this time, in the patch region PA, the proportions of the numbers of pixels of the foreground object region 501 and the background region 502 are approximately half and half, and the magnitudes of the motion vectors of the foreground object region 501 and the background region 502 are approximately the same as each other. In such a case, it is difficult to determine which of the motion vectors of the foreground object region 501 and the background region 502 is a main vector. Thus, whether or not the motion of the foreground object is to be obtained or the motion of the background is to be obtained as motion information regarding the pixel of interest PI in motion detection depends on the image at that time. Normally, in a region including more high-frequency components having large amplitudes, a difference is more likely to occur in the correlation values. Thus, a motion in this region is often detected. This motion, however, is not necessarily correct. That is, in this example, even if the motion vector of the foreground object region 501 should be detected, the motion vector of the relatively light background region 502 may be detected.

In contrast, as illustrated in FIG. 5B, in the case of an image in which the dark foreground object region 501 is widened through the minimum value filter process, the proportion of the number of pixels of a region including dark pixels, i.e., a region that can be regarded as the foreground object region 501, is larger in the patch region PA centered on the pixel of interest PI. Thus, if a motion at the pixel of interest PI is searched for in the image having been subjected to the filter process as illustrated in FIG. 5B, the motion vector of the foreground object region 501 is likely to be obtained as a main vector. In other words, according to the present exemplary embodiment, generating an image in which an object region is widened (expanded) through a filter process reduces the probability that a boundary between regions different in motion is present in the patch region PA. This improves the accuracy of motion detection in a boundary portion.

The above description has been provided taking as an example a case where the minimum value filter is selected. Alternatively, also in a case where the maximum value filter is selected, as in the above described case, it is possible to reduce the probability that a boundary between regions different in motion is present in a patch region, thus improving the accuracy of motion detection in a boundary portion.

In a case where an object region is relatively lighter than a background region, and if a pixel relatively lighter than peripheral pixels can be extracted, the aspect of the embodiments is not necessarily limited to the example where the maximum value filter is used as described above. For example, a pixel relatively lighter than peripheral pixels may be extracted using the following formula (1).

$$F_{max}(I, p) = \arg\max_{dp \subseteq \Omega}(I(p + dp)) \qquad \text{formula (1)}$$

In formula (1), $F_{max}$ is a function with which the maximum value of a region including a pixel indicated by coordinates p as the second argument from an image I as the first argument is acquired. In formula (1), $\Omega$ is a set of relative coordinate values in the range from −2 to +2 in each of the horizontal and vertical directions. That is, according to formula (1), the lightest pixel value is acquired among the pixel values of 5×5 pixels, for example, as a local region of a predetermined size.

All the pixels are then scanned using the following formula (2), whereby it is possible to obtain an output image $I_{out}$ in which a region including pixels that satisfy a predetermined condition is widened (expanded) as described above. In the maximum value filter process, even an important signal for the image is suppressed, resulting in the generation of a flat image. In formula (2), however, the original pixel value is added in a weighted manner to the image subjected to the maximum value filter, thereby leaving a minute signal. In formula (2), k represents weight and is 0.05 in the present exemplary embodiment.

$$I_{out}(p) = (1-k)F_{max}(I_{in}, p) + kI_{in}(p) \qquad \text{formula (2)}$$

Alternatively, effects similar to those of the formula (2) can also be obtained by using the following formula (3). In formula (3), $F_{avg}$ represents a smoothing filter. In formula (3), the weight k is added to the difference from a value obtained by applying the smoothing filter, and the resulting value is added to $F_{max}$.

$$I_{out}(x) = F_{max}(I_{in}, p) + k(I_{in}(p) - (F_{avg} * I_{in})(p)) \qquad \text{formula (3)}$$

In a case where an object region is darker than a background region, for example, a pixel relatively darker than peripheral pixels can be extracted using the following formulas (4), (5), and (6).

$$F_{min}(I, p) = \arg\max_{dp \subseteq \Omega}(I(p + dp)) \qquad \text{formula (4)}$$

$$I_{out}(x) = (1-k)F_{min}(I_{in}, p) + kI_{in}(p) \qquad \text{formula (5)}$$

$$I_{out}(x) = F_{min}(I_{in}, p) + k(I_{in}(x) - (F_{avg} * I_{in})(p)) \qquad \text{formula (6)}$$

In formula (4), $F_{min}$ is a function with which the minimum value in a region including a pixel indicated by coordinates p as the second argument from an image I as the first argument and is obtained. In formula (4), $\Omega$ represents a set of relative coordinate values in the range from −2 to +2 in each of the horizontal and vertical directions. In formula (4), the darkest pixel value is acquired among the pixel values of 5×5 pixels.

As described above, if an image is generated by extracting a pixel relatively lighter than peripheral pixels or a pixel relatively darker than peripheral pixels, it is possible to obtain effects equivalent to those described with reference to FIGS. 5A and 5B.

According to the present exemplary embodiment, a motion search using the SAD in detecting a motion vector is taken as an example. The aspect of the embodiments, however, is not limited to this. Alternatively, for example, a technique for using the sum of squared differences (SSD) or a feature amount may be used in detecting a motion vector. Yet alternatively, in detecting a motion vector, an interpolation image that is not limited to integer pixels may be generated, and motion detection with fractional pixel accuracy may be performed. Yet alternatively, a technique based on a gradient method typified by the Lucas-Kanade (LK) method may be used.

In the present exemplary embodiment, the description has been provided on the assumption that two temporally continuous images are acquired as the image of interest and the reference image. The aspect of the embodiments, however, is not limited to this. Alternatively, three or more images or a moving image may be acquired. Further, in a case where a moving image is continuously processed, a configuration may be employed in which a reference image is used as an image of interest in the next process, and an optical flow is detected based on the image of interest and a newly set reference image. In such a case, a reference region enlarged image based on the reference image is already generated and therefore can be used again. In the above exemplary embodiment, the description has been provided on the assumption that motion detection is densely performed, thereby detecting an optical flow. The aspect of the embodiments, however, is not limited to this. Depending on the purpose, only a feature point may be detected, i.e., motion detection may be sparsely performed. In the above example, the description has been provided on the assumption that a motion is detected. The present exemplary embodiment, however, can also be used for, for example, corresponding point matching in a stereo image. Also in a case where a stereo image is used, the optical flow is merely replaced with a relative coordinate map of corresponding points, and the technical configuration is not different from that for the motion detection.

In a second exemplary embodiment, a region enlargement process is performed using different techniques, and a single corresponding point is determined based on corresponding points detected from images subjected to the region enlargement process using the different techniques. In the second exemplary embodiment, a description is provided of a method for, without identifying the luminance of an object, generating an optical flow using hierarchy images (image pyramids) each including a plurality of reduced-size images generated from an input image. The configuration of an image processing apparatus 100 according to the second exemplary embodiment is similar to that in FIG. 1, and is not illustrated or described. Further, unless otherwise stated, the configuration of the apparatus and terms in the second exemplary embodiment are based on the description of the first exemplary embodiment, and components and processes similar to those in the first exemplary embodiment are designated by the same reference signs.

Figure 6:
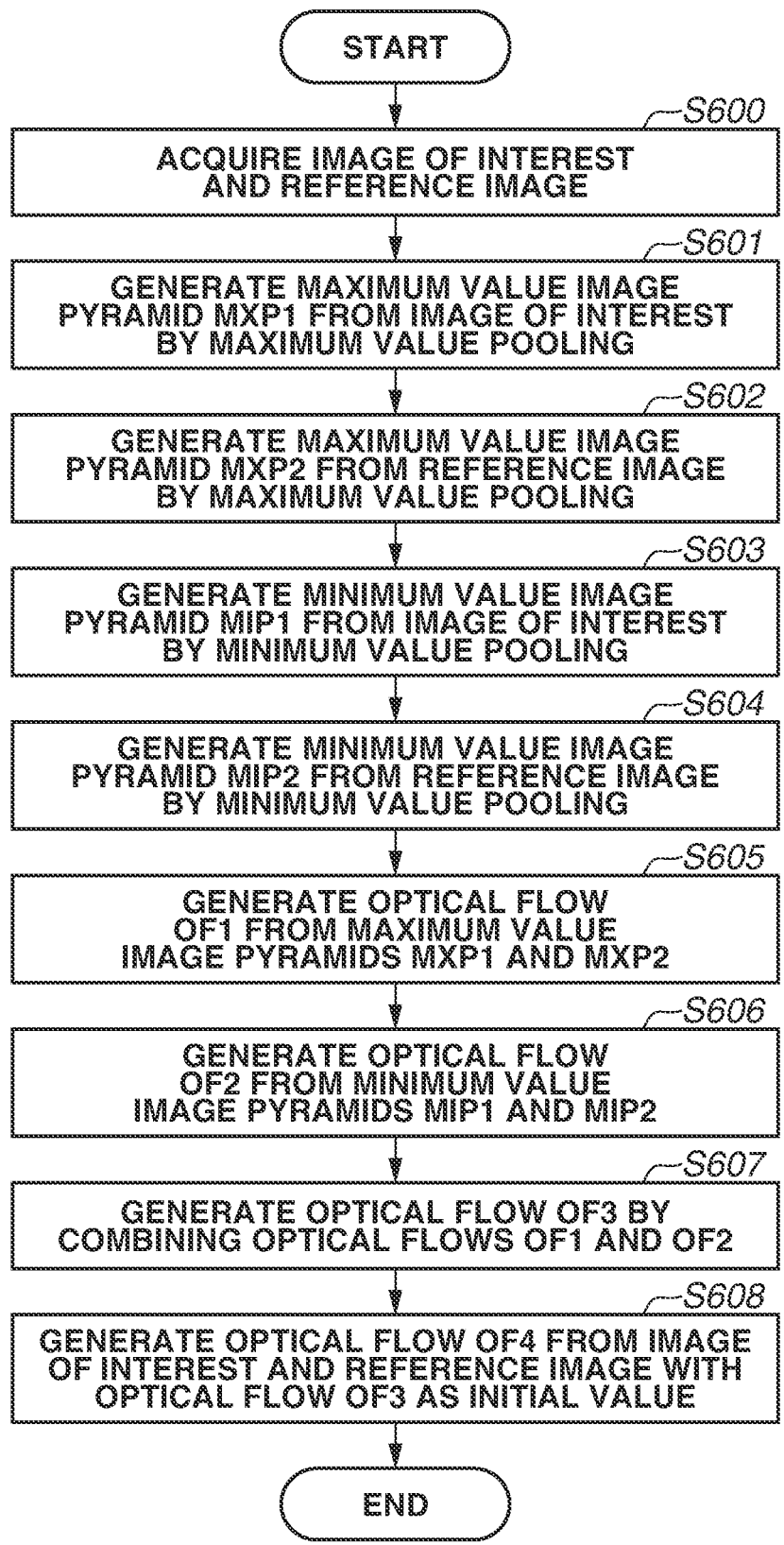
FIG. 6 is a flowchart of a process of generating an optical flow.

FIG. 6 is a flowchart illustrating the detailed flow of the process of generating an optical flow using image pyramid in the image processing apparatus 100 according to the second exemplary embodiment.

First, in step S600, as in step S401, the OF generation unit 104 acquires an image of interest and a reference image.

Next, in step S601, the OF generation unit 104 generates a maximum value image pyramid MXP1 from the image of interest through a maximum value pooling process. The pooling process is arithmetic processing for reducing the resolution of an image, thereby generating a reduced-size image. In the present exemplary embodiment, the image pyramid is generated while the image of interest being scaled at an area ratio of 25% (i.e., ¼). In a case where the image pyramid is generated while the image of interest being scaled at an area ratio of 25%, a reduced-size image can be generated by taking the average of a set of four adjacent pixels, for example. This process is generally termed an average value pooling process. According to the present exemplary embodiment, the image pyramid is generated, not through the general average value pooling process, but through the maximum value pooling process for selecting the greatest value among the pixel values of a set of four pixels, thereby generating a reduced image. In a case where the average value pooling process is performed, to reduce the influence of aliasing, high-frequency waves may be suppressed by applying a low-pass filter before the pooling process, thus suppressing the occurrence of aliasing after the pooling process. In the present exemplary embodiment, also in a case where the maximum value pooling process is performed, such a pre-filter process using a low-pass filter may be performed.

In step S602, the OF generation unit 104 generates a maximum value image pyramid MXP2 from the reference image through the maximum value pooling process. The image pyramid generation process in step S602 is performed using a technique similar to that in step S601.

Next, in step S603, the OF generation unit 104 generates a minimum value image pyramid MIP1 from the image of interest through a minimum value pooling process. The process of generating the image pyramid through the minimum value pooling process is performed using a technique similar to that described above, except that the minimum value is used instead of the maximum value in the maximum value pooling process.

In step S604, the OF generation unit 104 generates a minimum value image pyramid MIP2 from the reference image through the minimum value pooling process. The process of generating the image pyramid in step S604 is performed using a technique similar to that in step S603.

In step S605, using the maximum value image pyramid MXP1 generated from the image of interest and the maximum value image pyramid MXP2 generated from the reference image, the OF generation unit 104 generates an optical flow OF1. Here, in the present exemplary embodiment, the levels of each image pyramid are represented as follows. The level of the image that is not reduced in size among images in different levels in the image pyramid is referred to as an equal-magnification level LV0. Other images are referred to as, in descending hierarchical order (the descending order of sizes according to the reduction of the image), a reduction level LV1, a reduction level LV2, and a minimum level LVM as the smallest reduction level. In step S605, the OF generation unit 104 generates optical flows in hierarchical order from the minimum level LVM and acquires an optical flow generated at the reduction level LV1, which is one level lower than the equal-magnification level LV0, as the optical flow OF1. There is no limitation on the technique for the optical flow generation process at each level of the image pyramid. In the second exemplary embodiment, an optical flow is generated at each level using a technique similar to that described in step S406 in the first exemplary embodiment.

In generating optical flows in hierarchical order in step S605, first, using the minimum level LVM of each of the maximum value image pyramids MXP1 and MXP2, the OF generation unit 104 generates an optical flow at the minimum level LVM. Next, the OF generation unit 104 enlarges the optical flow generated at the minimum level LVM to match the reduction level LV2, which is one level higher than the minimum level LVM. Based on the enlarged optical flow, the OF generation unit 104 sets a search initial point at the reduction level LV2. The OF generation unit 104 performs a motion search from the search initial point at the reduction level LV2, thereby generating an optical flow. The OF generation unit 104 enlarges the optical flow generated at the reduction level LV2 to match the reduction level LV1, which is one level higher than the reduction level LV2. Based on the enlarged optical flow, the OF generation unit 104 sets a search initial point at the reduction level LV1. Then, the OF generation unit 104 performs a motion search from the search initial point at the reduction level LV1, thereby generating the optical flow OF1. In this way, the OF generation unit 104 sequentially performs the process of enlarging an optical flow generated at a lower level to match one level higher than the lower level, setting a search initial point, and performing a motion search from the search initial point, thereby generating optical flows in hierarchical order. However, unlike the example in the first exemplary embodiment, the search range at each level is a range of 5×5 pixels, for example. That is, since a search initial point at a processing target level is set based on an optical flow generated at one level lower than the processing target level, the search range does not need to be a wide range such as 15×15 pixels in the first exemplary embodiment. Thus, it is possible to accurately and quickly detect a motion even in a small range such as 5×5 pixels.

In step S606, using the minimum value image pyramid MIP1 and MIP2, the OF generation unit 104 generates an optical flow OF2. The technique for generating the optical flow in step S606 is similar to that described in step S605. That is, using the minimum value image pyramids MIP1 and MIP2, the OF generation unit 104 generates optical flows in hierarchical order, thereby generating the optical flow OF2 at the reduction level LV1.

Next, in step S607, the OF generation unit 104 combines the optical flow OF1 generated in step S605 and the optical flow OF2 generated in step S606, thereby generating an optical flow OF3. The optical flow combining process at this time will be described below with reference to the flowchart in FIG. 7.

Next, in step S608, with the optical flow OF3 as an initial value, the OF generation unit 104 generates an optical flow OF4 using the image of interest and the reference image at the equal-magnification level LV0. This optical flow generation technique is similar to that described in step S605. That is, in step S608, the OF generation unit 104 enlarges the optical flow OF3 combined in step S607 to match the equal-magnification level LV0. Then, based on the enlarged optical flow, the OF generation unit 104 sets a search initial point at the equal-magnification level LV0. The OF generation unit 104 then performs a motion search from the search initial point at the equal-magnification level LV0, thereby generating the optical flow OF4. When the optical flow OF3 is $F_3$, and the coordinates of a pixel of interest to be scanned in a motion search are p, the coordinates of a search initial point for a motion search at each pixel can be represented as $p+F_3(p)$. As described in step S605, The search range at this time is a range of 5×5 pixels based on the search initial point, as in the foregoing.

Figure 7:
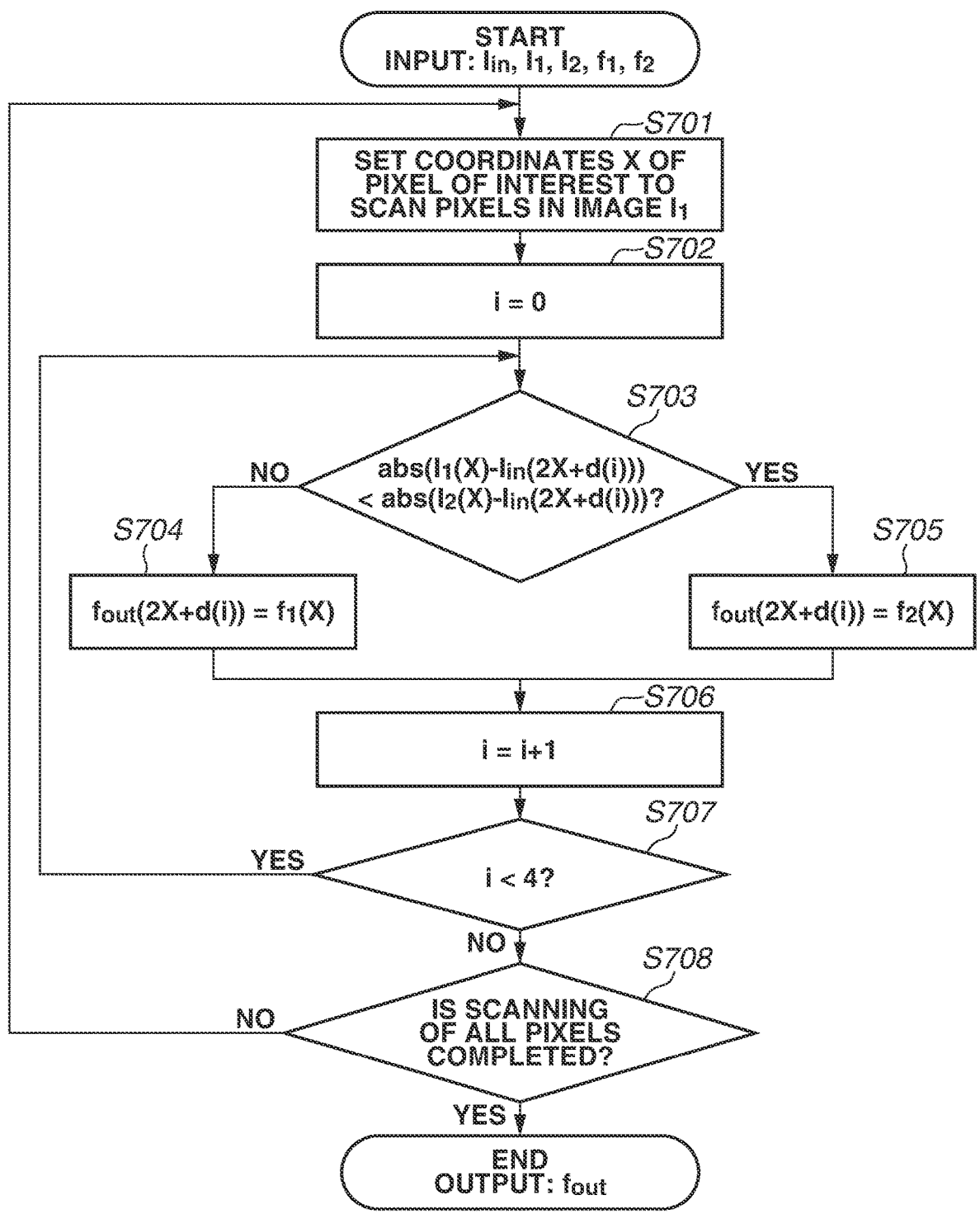
FIG. 7 is a flowchart of a process of combining optical flows.

FIG. 7 is a flowchart of the process of combining the two optical flows.

In the following description, an image $I_{in}$ represents an input image, i.e., the image at the equal-magnification level LV0. An image $I_1$ represents the image at the reduction level LV1 in each maximum value image pyramid generated through the maximum value pooling process. An image $I_2$ represents the image at the reduction level LV1 in each minimum value image pyramid generated through the minimum value pooling process. An optical flow $f_1$ represents the optical flow OF1 generated in step S605 in FIG. 6. An optical flow $f_2$ represents the optical flow OF1 generated in step S606 in FIG. 6. An optical flow $f_{out}$ represents the optical flow OF3 combined in step S606 in FIG. 6. In the flowchart in FIG. 7, the optical flow $f_{out}$ is output.

In step S701, the OF generation unit 104 sets coordinates X of a pixel of interest such that each pixel in the image $I_1$ are scanned. The coordinates X may be set as follows. Setting the coordinates of a pixel at the top left of the image $I_1$ as start coordinates. Sequentially setting the coordinates X so that pixels are scanned from left to right every time step S701 is executed with loop processing in FIG. 7, the processing moves to one line lower with the scanning of the single line being completed, and that the pixels are scanned from left to right again.

In step S702, the OF generation unit 104 initializes an index i of relative coordinates to 0. The relative coordinates will be described in step S703.

In step S703, the OF generation unit 104 performs the process of comparing the light and dark for each pixel in the input image, i.e., the image $I_{in}$ at the equal-magnification level LV0. Here, the coordinates of each pixel in the image $I_{in}$ as the input image are calculated by $2X+d(i)$, where $d(i)$ represents the relative coordinate value. For example, $d(0)=(0,0)$, $d(1)=(0,1)$, $d(2)=(1,0)$, and $d(3)=(1,1)$. In step S703, the OF generation unit 104 compares the absolute value of the difference between the image $I_{in}$ at the equal-magnification level LV0 and the image $I_1$ at the reduction level LV1 generated through the maximum value pooling process, and the absolute value of the difference between the image $I_{in}$ at the equal-magnification level LV0 and the image $I_2$ at the reduction level LV1 generated through the minimum value pooling process. If the absolute value of the difference between the images $I_{in}$ and $I_1$ is greater than or equal to the absolute value of the difference between the images $I_{in}$ and $I_2$ $(abs(I_1(X)-I_{in}(2X+d(i)))\geq(abs(I_2(X)31\ I_{in}(2X+d(i))))$(No in step S703), the processing proceeds to step S704. If the absolute value of the difference between the images $I_{in}$ and $I_2$ is greater than the absolute value of the difference between the images $I_{in}$ and $I_1$ $(abs(I_1(X)-I_{in}(2X+d(i)))<(abs(I_2(X)-I_{in}(2X+d(i))))$ (YES in step S703), the processing proceeds to step S705.

If the processing proceeds to step S704, the OF generation unit 104 substitutes a motion vector $(f_1(X))$ referenced at the coordinates X of the optical flow OF1 for an element $(f_{out}(2X+d(i)))$ represented by coordinates $2X+d(i)$ of the output optical flow $f_{out}$. The processing proceeds to step S706.

If the processing proceeds to step S705, the OF generation unit 104 substitutes a motion vector $(f_2(X))$ referenced at the coordinates X of the optical flow OF2 for the element $(f_{out}(2X+d(i)))$ represented by the coordinates $2X+d(i)$ of the output optical flow $f_{out}$. The processing proceeds to step S706.

If the processing proceeds to step S706, the OF generation unit 104 increments the index i of the relative coordinates.

In step S707, the OF generation unit 104 determines whether the index i is less than 4 (i<4). If the determination result is true (Yes in step S707), the processing returns to step S703. If the determination result is false (No in step S707), the processing proceeds to step S708.

If the processing proceeds to step S708, the OF generation unit 104 determines whether the scanning of all the pixels is completed. If the determination result is true (Yes in step S708), the processing of the flowchart in FIG. 7 ends. If the determination result is false (No in step S708), the processing returns to step S701.

Through the processes of steps S701 to S708, the all the pixels of the optical flows OF1 and OF2 are combined, thus generating the optical flow OF3. The optical flow OF3 is output as the optical flow $f_{out}$.

The image pyramid is used in order to, even if a single search range is small in motion detection at each level, detect a large motion vector at low resolution and perform a search again using as a search initial point the reference destination of the motion vector obtained from the low-resolution image, thereby accurately detecting a motion. If, however, the resolution of an image is lowered through a generally used average value pooling process or a technique for applying a low-pass filter and then thinning pixels, an object region and a background region can mix, and a motion at the boundary of the object can be erroneously detected. Moreover, if the erroneously detected motion is propagated during a hierarchy process, sufficient motion accuracy cannot be obtained in the final optical flow. By contrast, in the present exemplary embodiment, two optical flows are generated at the same predetermined level based on hierarchy images generated through the maximum value pooling process and the minimum value pooling process. The optical flows are combined based on the result of comparing the absolute values of the differences between the hierarchy images. In the present exemplary embodiment as well, this configuration enables the generation of an optical flow based on an image in which an object region is widened with the contour shape of the object being maintained. Thus, it is also possible in the present exemplary embodiment to improve the accuracy of motion detection in a boundary portion, as in the description with reference to FIGS. 5A and 5B in the first exemplary embodiment. According to the present exemplary embodiment, both an image pyramid in which a relatively light pixel is extracted and an image pyramid in which a relatively dark pixel is extracted are used. This excludes the need for specification of an object region and obtaining of the lightness of the object region as in the first exemplary embodiment.

Figure 3B:
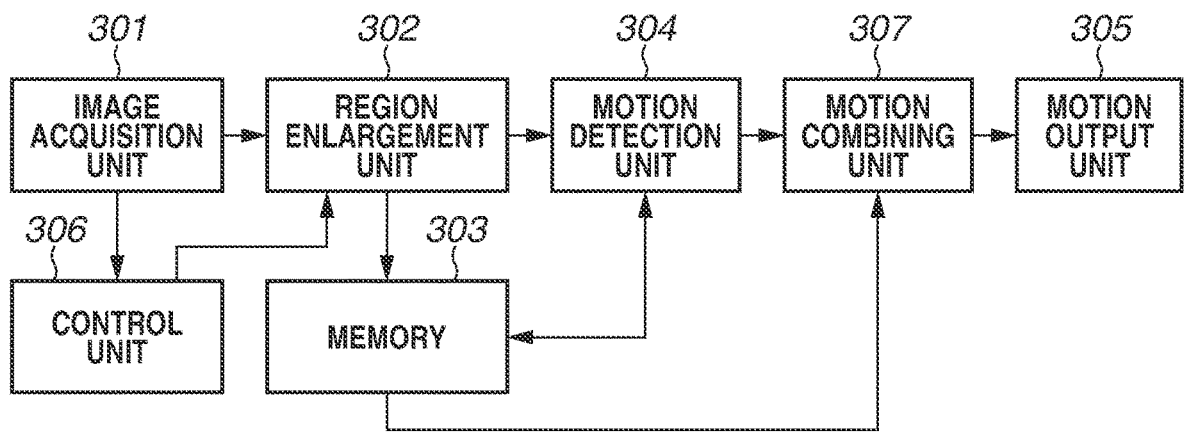

In the description of the flowcharts in FIGS. 6 and 7 in the second exemplary embodiment, an example has been described where the processing steps are executed by a program. The aspect of the embodiments, however, is not limited to this. Alternatively, the processing steps may be executed by an image processing apparatus having a circuit configuration corresponding to each process. FIG. 3B illustrates an example of the configuration of the image processing apparatus 100 according to the second exemplary embodiment in a case where the process of detecting a motion vector and generating an optical flow is implemented by a hardware configuration based on circuits in the image processing apparatus 100.

In FIG. 3B, the image acquisition unit 301 performs a process corresponding to step S600 in FIG. 6. A region enlargement unit 302 performs processes equivalent to steps S601 to S604. A motion detection unit 304 performs processes equivalent to steps S605, S606, and S608. A motion combining unit 307 performs a process equivalent to step S607 in FIG. 6 and processing equivalent to the flowchart in FIG. 7. In the present exemplary embodiment, for example, the control unit 306 rewrites a setting value in a register in the region enlargement unit 302, thereby switching the pooling processes in the region enlargement unit 302. The region enlargement unit 302 may be a module for reducing the resolution of an image to a quarter and generating an image pyramid while performing the maximum value pooling process or the minimum value pooling process. The region enlargement unit 302 generates maximum value image pyramids MXP1 and MXP2 and minimum value image pyramids MIP1 and MIP2 and stores the generated maximum value image pyramids MXP1 and MXP2 and the generated minimum value image pyramids MIP1 and MIP2 in a memory 303. The motion detection unit 304 performs motion detection based on a set of the maximum value image pyramids MXP1 and MXP2, thereby generating an optical flow OF1. The motion detection unit 304 stores the generated optical flow OF1 in the memory 303. The motion detection unit 304 performs motion detection based on a set of the minimum value image pyramids MIP1 and MIP2, thereby generating an optical flow OF2. The motion detection unit 304 stores the generated optical flow OF2 in the memory 303. The motion combining unit 307 combines the optical flows OF1 and OF2, thereby generating an optical flow OF3. The generated optical flow OF3 is stored in the memory 303 through the motion output unit 305. The motion detection unit 304 generates an optical flow OF4 from the image of interest and the reference image at the equal-magnification level LV0, with the optical flow OF3 as an initial value. In the present exemplary embodiment, an example has been taken where a single region enlargement unit performs the maximum value pooling process and the minimum value pooling process. Alternatively, modules for individually performing the maximum value pooling process and the minimum value pooling process may be provided.

In a third exemplary embodiment, a region enlargement process is performed using techniques different from those in the example of the second exemplary embodiment, and a single corresponding point is determined based on corresponding points detected from images subjected to the region enlargement process using the different techniques. In the third exemplary embodiment, with reference to FIG. 8, a description will be provided of a method for generating an optical flow without identifying the average pixel value in a main object region. The configuration of an image processing apparatus 100 according to the third exemplary embodiment is similar to that illustrated in FIG. 1, and is not illustrated or described. Unless otherwise stated, the configuration of the apparatus and terms in the third exemplary embodiment are based on the description of the first exemplary embodiment, and components and processes similar to those in the first exemplary embodiment are designated by the same reference signs.

Figure 8:
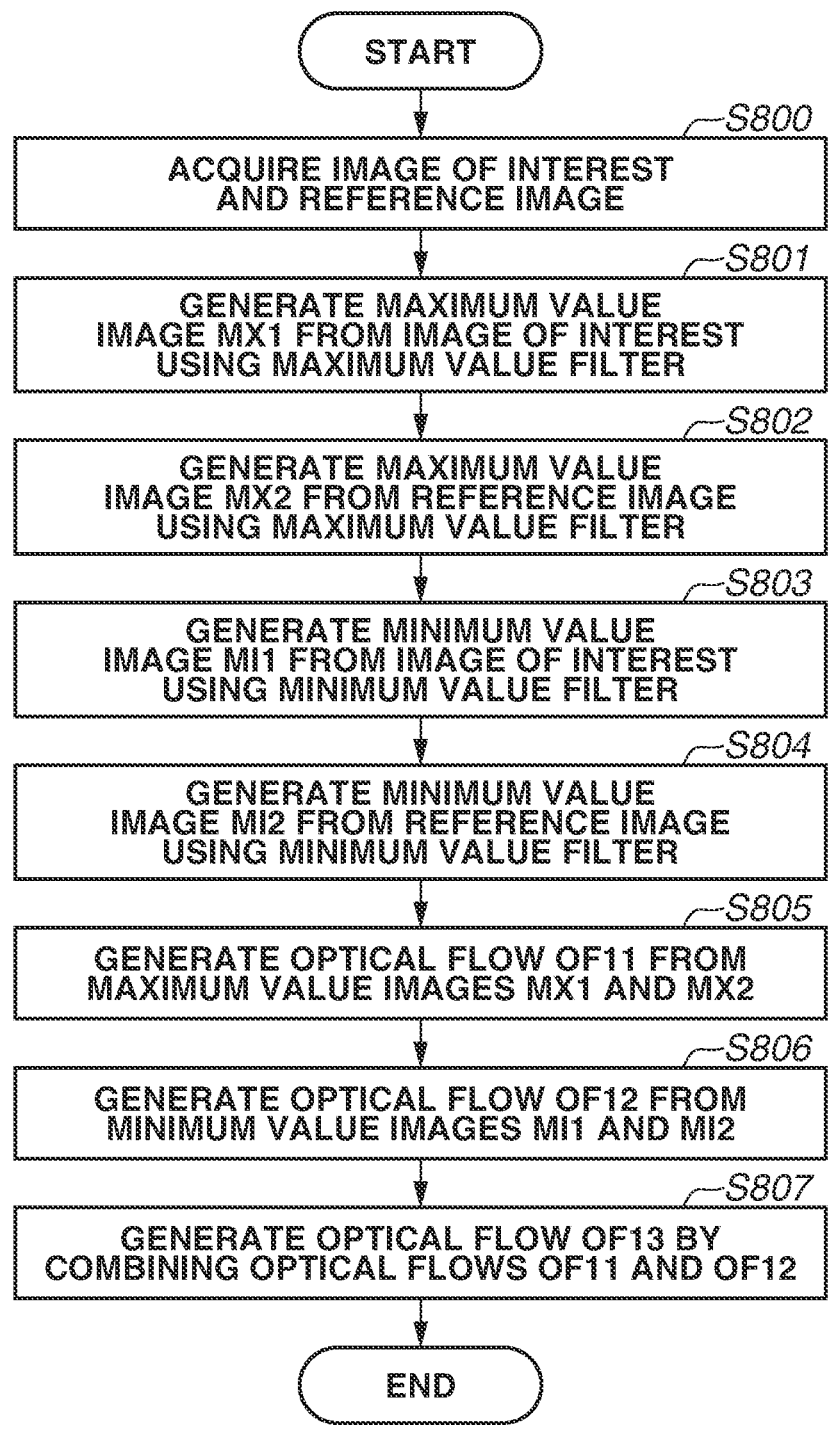
FIG. 8 is a flowchart of a process of generating an optical flow according to a third exemplary embodiment.

FIG. 8 is a flowchart illustrating the detailed flow of the process of detecting a motion vector and generating an optical flow in the image processing apparatus 100 according to the third exemplary embodiment.

In step S800, as in step S401, the OF generation unit 104 acquires an image of interest and a reference image.

Next, in step S801, the OF generation unit 104 generates a maximum value image MX1 from the image of interest using the maximum value filter. The maximum value filter process is similar to that described in the first exemplary embodiment. In the third exemplary embodiment, the maximum value image MX1 is an image in which a relatively light object region is widened (expanded) in the image of interest.

In step S802, the OF generation unit 104 generates a maximum value image MX2 from the reference image using the maximum value filter, as in step S801. The maximum value image MX2 is an image in which a relatively light object region is widened (expanded) in the reference image.

In step S803, the OF generation unit 104 generates a minimum value image MI1 from the image of interest using the minimum value filter. The minimum value filter process is similar to that described in the first exemplary embodiment. The minimum value image MI1 is an image in which a relatively dark object region is widened (expanded) in the image of interest.

In step S804, the OF generation unit 104 generates a minimum value image MI2 from the reference image using the minimum value filter, as in step S803. The minimum value image MI2 is an image in which a relatively dark object region is widened (expanded) in the reference image.

Next, in step S805, the OF generation unit 104 generates an optical flow OF11 from the maximum value images MX1 and MX2. There is no limitation on the optical flow generation technique. In the present exemplary embodiment, the technique similar to that described in step S406 in the first exemplary embodiment is used.

In step S806, the OF generation unit 104 generates an optical flow OF12 from the minimum value images MI1 and MI2, as in step S805.

In step S807, the OF generation unit 104 combines the optical flows OF11 and OF12, thereby generating an optical flow OF13.

Figure 9:
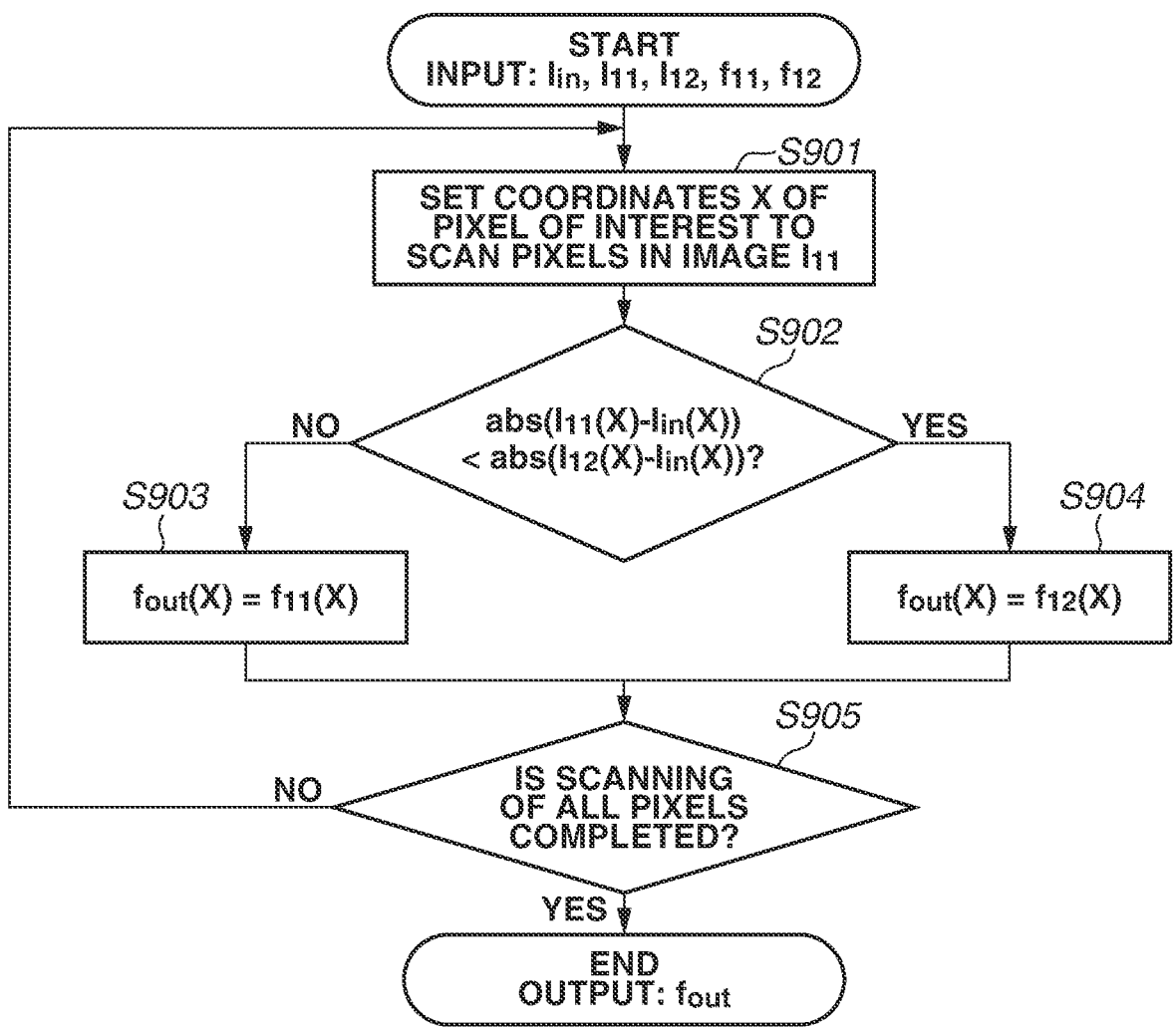
FIG. 9 is a flowchart of a process of combining optical flows according to the third exemplary embodiment.

FIG. 9 is a flowchart of the process of combining the two optical flows in the third exemplary embodiment.

In the following description, an image $I_{in}$ represents the image of interest. An image $I_{11}$ represents the maximum value image MX1 generated from the image of interest through the maximum value filter process. An image $I_{12}$ represents the maximum value image MX2 generated from the reference image through the maximum value filter process. An optical flow $f_{11}$ represents the optical flow OF11. An optical flow $f_{12}$ represents the optical flow OF12. An output optical flow $f_{out}$ represents the optical flow OF13.

In step S901, the OF generation unit 104 sets coordinates X of a pixel of interest so that the pixels in the image $I_{11}$ are scanned. As in step S701, the coordinates X are set in order as follows. Setting a pixel at the top left of the image $I_{11}$ as a start pixel. Sequentially setting the coordinates X so that pixels are scanned from left to right every time step S901 is executed by loop processing in FIG. 9, the processing moves to one line lower after the processing on the single line is completed, and that pixels are scanned from left to right again.

In step S902, the OF generation unit 104 compares the absolute value of the difference between the images $I_{in}(X)$ and $I_{11}(X)$, and the absolute value of the difference between the images $I_{in}(X)$ and $I_{12}(X)$. If the absolute value of the difference between the images $I_{in}(X)$ and $I_{11}(X)$ is greater than or equal to the absolute value of the difference between the images $I_{in}(X)$ and $I_{12}(X)$ $(abs(I_{11}(X)-I_{in}(X))) \geq (abs(I_{12}(X)-I_{in}(X)))$ (No in step S902), the processing proceeds to step S903. If the absolute value of the difference between the images $I_{in}(X)$ and $I_{12}(X)$ is greater than the absolute value of the difference between the images $I_{in}(X)$ and $I_{11}(X)$ $(abs(I_{11}(X)-I_{in}(X)))<(abs(I_{12}(X)-I_{in}(X)))$ (YES in step S902), the processing proceeds to step S904.

If the processing proceeds to step S903, the OF generation unit 104 substitutes the optical flow $f_{11}(X)$ for the output optical flow $f_{out}(X)$. The processing proceeds to step S905.

If the processing proceeds to step S904, the OF generation unit 104 substitutes the optical flow $f_{12}(X)$ for the output optical flow $f_{out}(X)$. The processing proceeds to step S905.

In the processing proceeds to step S905, the OF generation unit 104 determines whether the scanning of all the pixels is completed. If the determination result is true (Yes in step S905), the processing of the flowchart in FIG. 9 ends. If the determination result is false (No in step S905), the processing returns to step S901.

Through the processes of steps S901 to S905, all the pixels of the optical flows OF11 and OF12 are combined, thereby generating the optical flow OF13. The optical flow OF13 is then output as the optical flow $f_{out}$.

In the third exemplary embodiment, the average pixel value in a main object region is not identified as in the first exemplary embodiment, and light and dark regions in each of an image of interest and a reference image are widened with the maximum value filter process and the minimum value filter process, thereby generating maximum value images and minimum value images. According to the third exemplary embodiment, an optical flow is generated using the maximum value images generated from the image of interest and the reference image. Using the minimum value images generated from the image of interest and the reference image, an optical flow is further generated. According to the third exemplary embodiment, the two optical flows are combined based on the result of comparing the absolute values of the differences between the image of interest and the reference image. In the third exemplary embodiment as well, this also enables generation of an optical flow with high accuracy at a boundary based on an image in which an object region is widened with the contour shape of the object being maintained. In the third exemplary embodiment, unlike the second exemplary embodiment, it is not essential to perform the maximum value pooling process and the minimum value pooling process. In the third exemplary embodiment, however, the processing of the flowchart in FIG. 8 can be also applied to processing at each level in general image pyramid processing as described in the second exemplary embodiment. In the third exemplary embodiment, in combination with the processing in the second exemplary embodiment, the maximum value filter process can also be further applied to an image generated using the maximum value pooling process, and the minimum value filter process can also be further applied to an image generated using the minimum value pooling process.

In the description of the flowcharts in FIGS. 8 and 9 in the third exemplary embodiment, an example has been described where the processing steps are executed with a program. The aspect of the embodiments, however, is not limited to this. Alternatively, the processing steps may be executed by an image processing apparatus having a circuit configuration corresponding to each process. In the image processing apparatus 100 according to the third exemplary embodiment, a hardware configuration based on circuits for implementing the process of detecting a motion vector and generating an optical flow is similar to that illustrated in FIG. 3B.

In the third exemplary embodiment, in FIG. 3B, the image acquisition unit 301 performs a process equivalent to step S800 in FIG. 8. A region enlargement unit 302 performs processes equivalent to steps S801 to S804. The motion detection unit 304 performs processes equivalent to steps S805 and S806. The motion combining unit 307 performs a process equivalent to step S807 and processing equivalent to the flowchart in FIG. 9. In the third exemplary embodiment, the control unit 306 rewrites a setting value in a register in the region enlargement unit 302, thereby switching the maximum value filter process and the minimum value filter process in the region enlargement unit 302. The region enlargement unit 302 performs the process of widening regions in an image of interest and a reference image, thereby generating maximum value images MX1 and MX2 and minimum value images MI1 and MI2. The region enlargement unit 302 stores the generated maximum value images MX1 and MX2 and the generated minimum value images MI1 and MI2 in the memory 303. The motion detection unit 304 performs motion detection based on a set of the maximum value images MX1 and MX2, thereby generating an optical flow OF11. The motion detection unit 304 stores the generated optical flow OF11 in the memory 303. The motion detection unit 304 performs motion detection based on a set of the minimum value images MI1 and MI2, thereby generating an optical flow OF12. The motion detection unit 304 stores the generated optical flow OF12 in the memory 303. The motion combining unit 307 combines the optical flows OF11 and OF12, thereby generating an optical flow OF13. The optical flow OF13 is output via the motion output unit 305. In the present exemplary embodiment, an example has been taken where a single region enlargement unit performs the maximum value filter process and the minimum value filter process by switching the processes. Alternatively, modules for individually performing the maximum value filter process and the minimum value filter process may be provided.

In a fourth exemplary embodiment, with reference to FIG. 10, an example is described where a label image is input, thereby generating an optical image. The configuration of the image processing apparatus 100 according to the fourth exemplary embodiment is similar to FIG. 1, and is not illustrated or described. Unless otherwise stated, the configuration of the apparatus and terms in the fourth exemplary embodiment are based on the description of the first exemplary embodiment, and components and processes similar to those in the first exemplary embodiment are designated by the same reference signs.

In a fourth exemplary embodiment, a "label image" refers to an image obtained as a map with a label identification (ID) being assigned to each pixel in the image. An image is segmented into regions corresponding to objects, and an ID is assigned to each object. That is, the label image is an image having a label ID as a pixel value. As the techniques for the region segmentation process and the label image generation process, there are various techniques. In the present exemplary embodiment, any of the techniques may be used. These techniques are widely known, and therefore are not described in the present exemplary embodiment.

FIG. 10 is a flowchart illustrating the detailed flow of the process of generating an optical image based on a label image in the image processing apparatus 100 according to the fourth exemplary embodiment.

In step S1001, the OF generation unit 104 acquires an image of interest and a reference image as in step S401.

In step S1002, the OF generation unit 104 acquires a label image of the image of interest and a label image of the reference image.

In step S1003, the OF generation unit 104 widens a region in the image of interest using the label image of the image of interest, thereby generating a region-of-interest enlarged image. The region enlargement method using the label image will be described below.

In step S1004, the OF generation unit 104 widens a region in the reference image using the label image of the reference image, thereby generating a reference region enlarged image, as in step S1003.

In step S1005, the OF generation unit 104 acquires motion information from the region-of-interest enlarged image and the reference region enlarged image. There is no limitation on the method for obtaining the motion information. In the present exemplary embodiment, an optical flow is generated, and the method is similar to that described in step S406 in the first exemplary embodiment.

The region enlargement method using the label image is described below.

In the present exemplary embodiment, the label ID of a main object region is $l_{main}$. There is no limitation on the method for determining the label ID for the main object region. As a main object, an object depending on the purpose may be determined. For example, a user may specify the label ID of the main object region through a graphical user interface (GUI). Alternatively, an image recognition algorithm may be applied, and the label of the region of a person may have the label ID of the main object region.

If a region enlarged image such as the region-of-interest enlarged image or the reference region enlarged image is $I_{ext}$, $I_{ext}$ is represented by the following formulas (7) to (9).

$$f_{equal}(a, b) = \begin{cases} 1 & \text{if } a = b \\ 0 & \text{else} \end{cases} \quad \text{formula (7)}$$

$$c = \sum_{dp \subseteq \Omega} f_{equal}(L(p + dp), l_{main}) \quad \text{formula (8)}$$

$$I_{ext}(p) = \begin{cases} \dfrac{\sum_{dp \subseteq \Omega} I(p) \cdot f_{equal}(L(p + dp), l_{main})}{c} & \text{if } c \geq th \\ I(p) & \text{otherwise} \end{cases} \quad \text{formula (9)}$$

In the formulas, $\Omega$ represents a set of relative coordinate values in the range from −2 to +2 in each of the horizontal and vertical directions. A threshold th is 1 (th=1). The OF generation unit 104 counts pixels having the label ID "$l_{main}$" in a region of 5×5 pixels centered on a pixel of interest. The OF generation unit 104 then determines whether the number of the counted pixels is greater than or equal to the threshold th (th=1 or more). If the number of the counted pixels having the label ID "$l_{main}$" is greater than or equal to the threshold th, the OF generation unit 104 regards the pixel of interest as a pixel of a main object region. The OF generation unit 104 calculates the average pixel value of the pixels having the label ID "$l_{main}$" in the region of 5×5 pixels.

With reference to FIGS. 11A to 11C, a description will be provided of the process of generating the region enlarged image based on the label image.

FIG. 11A is a diagram schematically illustrating an extracted part of a boundary portion between a foreground object and the background. FIG. 11B is a diagram illustrating an example of a label image corresponding to FIG. 11A. FIG. 11C is a diagram schematically illustrating a region enlarged image obtained with a region in FIG. 11A being widened using the label image in FIG. 11B. In FIGS. 11A to 11C, a single square represents a single pixel as in the example in FIGS. 5A and 5B. The image in FIG. 11A includes three different regions (objects and the background), namely regions 1101, 1102, and 1103. As illustrated in FIG. 11A, the region 1101 moves leftward as indicated by the leftward arrow. On the other hand, the regions 1102 and 1103 move rightward as indicated by rightward arrows. FIGS. 11A and 11C also illustrate a pixel of interest PI and a patch region PE including 7×7 pixels centered on the pixel of interest PI.

In this example, assume that when the patch region PE including 7×7 pixels centered on the pixel of interest PI is set in the image illustrated in FIG. 11A, boundary portions between the regions 1101 to 1103 are present in the patch region PE. Assume that in the patch region PE, the proportions of the numbers of pixels of the regions 1101 to 1103 are close to each other, and the directions of the motion vectors of the regions 1101 to 1103 are different from each other, but the magnitudes of the motion vectors are close to each other. In such a case, it is difficult to determine which of the motion vectors of the regions 1101 to 1103 is a main vector. Which of the motions of the regions is to be obtained depends on the image at that time. That is, in this example, even if the motion vector of the region 1101 as a foreground object should be detected, the motion vectors of the other regions 1102 and 1103 may be detected.

In the label image illustrated in FIG. 11B, among numerical values described in the pixels, "0" is a label ID indicating a main object, and "1" is a label ID indicating the background. In a region enlargement process for widening a region based on the label image, pixels having the label ID "0," indicating the main object, are counted in a region of 5×5 pixels centered on the pixel of interest PI, and if the number of the counted pixels is greater than or equal to the threshold th (one or more), the pixel of interest PI is regard as a pixel of a main object region. The average pixel value of the pixels having the label ID "0" in the region of 5×5 pixels is calculated. That is, using the label image illustrated in FIG. 11B, the process of widening the main object region 1101 in FIG. 11A corresponding to the label ID "0" is performed. Thus, as illustrated in FIG. 11C, a region enlarged image in which the main object region 1101 is widened is obtained. In this way, even if the patch region PE is set in the periphery of the pixel of interest PI as illustrated in FIG. 11A, a large portion of the pixels of the patch region PE are pixels of the main object region 1101 as illustrated in FIG. 11C. Thus, in the detection of a motion vector using correlation determination, a motion at the pixel of interest PI is likely to be detected as a leftward motion indicated by the leftward arrow in the region 1101 in FIG. 11A.

In the fourth exemplary embodiment, if a predetermined condition that a certain number of pixels regarded as a main object are present in neighboring pixels of a pixel of interest is satisfied, the average of the pixels regarded as the main object is calculated and is used as the output value of the pixel of interest. If this condition is not satisfied, the original value of the pixel of interest is used without change. Through these processes, a region enlarged image in which a main object region is widened is generated. Thus, effects similar to those of the first to third exemplary embodiments are obtained. In the first to third exemplary embodiments, a region is expanded with attention to relative light and dark. In the fourth exemplary embodiment, however, not only light and dark but also a label image is referenced, thus achieving widening a target region.

In the fourth exemplary embodiment, an example has been taken where a target in which a region is widened is limited to a single target. The aspect of the embodiments, however, is not limited to this. Alternatively, the processing in FIG. 10 is applied using a label image in which a plurality of main objects is set and a label ID is assigned to each of the plurality of main objects, thus achieving widening each of a plurality of main object regions.

Figure 3C:
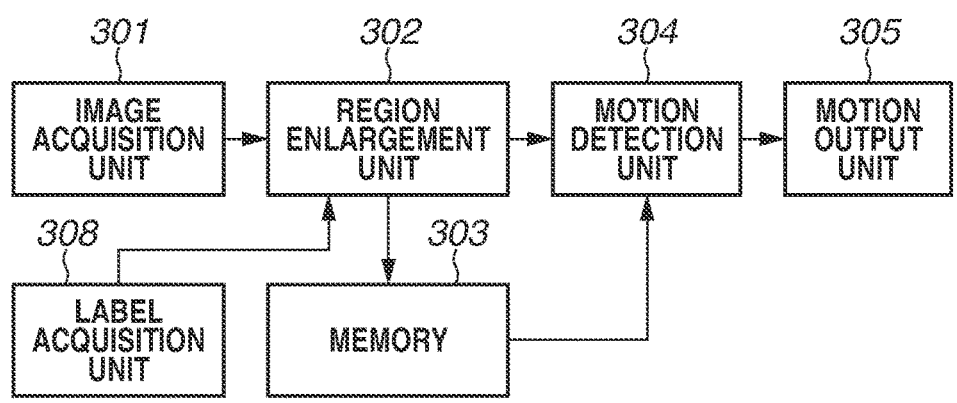

Further, in the description of the flowchart in FIG. 10 in the fourth exemplary embodiment, an example has been described where the processing steps are executed by a program. The aspect of the embodiments, however, is not limited to this. Alternatively, the processing steps may be executed by an image processing apparatus having a circuit configuration corresponding to each process. FIG. 3C illustrates a configuration example of the image processing apparatus 100 according to the fourth exemplary embodiment in a case of implementing the process of detecting a motion vector and generating an optical flow through a region enlargement process using a label image, with a hardware configuration based on circuits in the image processing apparatus 100.

In FIG. 3C, the image acquisition unit 301 performs a process corresponding to step S1001 in FIG. 10. A label acquisition unit 308 performs a process equivalent to step S1002, i.e., acquires label images. A configuration is employed in which the label images are generated by the label acquisition unit 308 itself. The aspect of the embodiments, however, is not limited to this. Label images that have been generated may be acquired. The region enlargement unit 302 performs processes equivalent to steps S1003 and S1004. The region enlargement unit 302 performs the process of widening regions in an image of interest and a reference image using the label images, and stores, for example, a reference region enlarged image in the memory 303. A motion detection unit 304 performs a process equivalent to step S1005. The motion detection unit 304 performs motion detection using the region-of-interest enlarged image generated by the region enlargement unit 302 and the reference region enlarged image present in the memory 303, thereby obtaining motion information. The motion output unit 305 outputs the generated motion information.

In the first to fourth exemplary embodiments, for a pixel of interest, an image (a region enlarged image) with pixels having similar feature components in the periphery of the pixel of interest being selected and replaced is generated, and a motion is detected from the region enlarged image. The region enlarged image is an image with an object region being widened and the shape of the contour of the object region being maintained. Thus, according to the exemplary embodiments, in a case where motion detection at a pixel of interest is performed, and even if a patch region of the pixel of interest extends over the boundary of an object in an input image, the patch region hardly extends over the boundary of the object in a region enlarged image. This improves the accuracy of motion detection at the pixel of interest.

The above exemplary embodiments merely illustrate specific examples for carrying out the disclosure, and the technical scope of the disclosure should not be interpreted in a limited manner based on these exemplary embodiments. That is, the aspect of the embodiments can be carried out in various manners without departing from the technical idea or the main feature of the aspect of the embodiments.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-130071, filed Jul. 9, 2018, which is hereby incorporated by reference herein in its entirety.

What is claimed is:

1. An apparatus comprising:
an acquisition unit configured to acquire an input image and a reference image;
a region enlargement unit configured to perform, on each of the input image and the reference image, a region enlargement process for widening a region including pixels that satisfy a predetermined condition; and
a detection unit configured to detect a corresponding point in the reference image subjected to the region enlargement process, the corresponding point corresponding to a pixel of interest in the input image subjected to the region enlargement process,
wherein the region enlargement unit performs the region enlargement process using one of a maximum value filter and a minimum value filter depending on a value of a pixel, and
wherein in a case where the region enlargement process is performed using the maximum value filter, the region enlargement unit extracts a pixel having a relatively great value in a local region and generates an image subjected to the region enlargement process using a value of the extracted pixel.

2. The apparatus according to claim 1, wherein the region enlargement unit has a function of performing the region enlargement process, and
wherein the detection unit determines a single corresponding point based on a corresponding point detected from an image subjected to the region enlargement process.

3. The apparatus according to claim 2, wherein the detection unit sets the determined corresponding point as an initial point to be used to search the reference image subjected to the region enlargement process for a corresponding point.

4. The apparatus according to claim 2, wherein the region enlargement unit performs a maximum value pooling process and a minimum value pooling process on the input image and the reference image, and
wherein the detection unit determines the single corresponding point based on a corresponding point detected using an image generated from the input image through the maximum value pooling process and an image generated from the reference image through the maximum value pooling process, and a corresponding point detected using an image generated from the input image through the minimum value pooling process and an image generated from the reference image through the minimum value pooling process.

5. The apparatus according to claim 4, wherein, based on the determined corresponding point, the detection unit sets an initial point to be used to search the reference image for a corresponding point.

6. The apparatus according to claim 5, wherein the region enlargement unit generates a plurality of hierarchy images through each of the maximum value pooling process and the minimum value pooling process, and
wherein the detection unit detects a corresponding point at a predetermined level from the plurality of hierarchy images generated through the maximum value pooling process and the plurality of hierarchy images generated through the minimum value pooling process, and sets, based on the corresponding point detected at the predetermined level, the initial point to be used to search the reference image for a corresponding point.

7. The apparatus according to claim 4, wherein the detection unit calculates as a first optical flow an optical flow at one level lower than a level with same resolution as the input image using a plurality of hierarchy images generated by the maximum value pooling process,
wherein, using a plurality of hierarchy images generated by the minimum value pooling process, the detection unit calculates as a second optical flow an optical flow at one level lower than the level with the same resolution as the input image, and
wherein, based on the first optical flow, the second optical flow, and the input image, the detection unit calculates an optical flow at the same resolution as the resolution of the input image.

8. The apparatus according to claim 7, wherein the detection unit compares an absolute value of a difference between a pixel value of the pixel of interest in the input image and a pixel value of the pixel of interest in an image at one level lower than the level with the same resolution as the input image among the hierarchy images generated through the maximum value pooling process, and an absolute value of a difference between the pixel value of the pixel of interest in the input image and a pixel value of the pixel of interest in an image at one level lower than the level with the same resolution as the input image among the hierarchy images generated through the minimum value pooling process, and
wherein, based on the result of the comparison, the detection unit selects either a corresponding point corresponding to the pixel of interest in the first optical flow or a corresponding point corresponding to the pixel of interest in the second optical flow.

9. The apparatus according to claim 2, wherein the detection unit compares a pixel value in an image before being subjected to the region enlargement process and each of pixel values in the image after being subjected to the region enlargement process, selects a pixel that has been subjected to the region enlargement process and has a pixel value close to the pixel value in the image before being subjected to the region enlargement process, and determines a corresponding point corresponding to the selected pixel as the single corresponding point.

10. The apparatus according to claim 1, wherein in a case where the region enlargement process is performed using the minimum value filter, the region enlargement unit extracts a pixel having a relatively small value in a local region and generates an image subjected to the region enlargement process using a value of the extracted pixel.

11. The apparatus according to claim 1, further comprising an acquisition unit configured to acquire a label image in which pixels are each assigned a label identification (ID) corresponding to the input image and the reference image,
 wherein, with reference to the label image, the region enlargement unit performs the region enlargement process for widening a region including a pixel that satisfies the predetermined condition.

12. The apparatus according to claim 11, wherein the label image is an image representing at least a main object region and another region by different label IDs, and
 wherein the region enlargement unit performs the region enlargement process on a region including a label ID indicating the main object region.

13. The apparatus according to claim 12, wherein, in a case where the number of counted pixels having the label ID indicating the main object region is greater than or equal to a threshold in a local region including a plurality of pixels centered on the pixel of interest, the region enlargement unit regards the pixel of interest as a pixel of the main object region, calculates an average value of pixels corresponding to the label ID indicating the main object region in the local region, and sets the average value as a pixel value of the pixel of interest.

14. The apparatus according to claim 1, wherein the detection unit generates an optical flow with a motion vector corresponding to each pixel being mapped based on the pixel of interest in the input image subjected to the region enlargement process and a corresponding point in the reference image subjected to the region enlargement process.

15. The apparatus according to claim 14, wherein the detection unit calculates as the optical flow an image in which a motion vector is stored with respect to each pixel.

16. A method comprising:
 acquiring an input image and a reference image;
 performing, on each of the input image and the reference image, a region enlargement process for widening a region including pixels that satisfy a predetermined condition; and
 detecting a corresponding point in the reference image subjected to the region enlargement process, the corresponding point corresponding to a pixel of interest in the input image subjected to the region enlargement process,
 wherein the performing performs the region enlargement process using one of a maximum value filter and a minimum value filter depending on a value of a pixel, and
 wherein in a case where the region enlargement process is performed using the maximum value filter, the region enlargement unit extracts a pixel having a relatively great value in a local region and generates an image subjected to the region enlargement process using a value of the extracted pixel.

17. The method according to claim 16, further comprising:
 in a case where the region enlargement process is performed using the maximum value filter, extracting a pixel having a relatively great value in a local region and generating an image subjected to the region enlargement process using a value of the extracted pixel; and
 in a case where the region enlargement process is performed using the minimum value filter, extracting a pixel having a relatively small value in a local region and generating an image subjected to the region enlargement process using a value of the extracted pixel.

18. A non-transitory computer-readable storage medium storing instructions that, when executed by a computer, cause the computer to perform a method comprising:
 acquiring an input image and a reference image;
 performing, on each of the input image and the reference image, a region enlargement process for widening a region including pixels that satisfy a predetermined condition; and
 detecting a corresponding point in the reference image subjected to the region enlargement process, the corresponding point corresponding to a pixel of interest in the input image subjected to the region enlargement process,
 wherein the performing performs the region enlargement process using one of a maximum value filter and a minimum value filter depending on a value of a pixel, and
 wherein in a case where the region enlargement process is performed using the maximum value filter, the region enlargement unit extracts a pixel having a relatively great value in a local region and generates an image subjected to the region enlargement process using a value of the extracted pixel.

19. The non-transitory computer-readable storage medium according to claim 18, further comprising:
 in a case where the region enlargement process is performed using the maximum value filter, extracting a pixel having a relatively great value in a local region and generating an image subjected to the region enlargement process using a value of the extracted pixel; and
 in a case where the region enlargement process is performed using the minimum value filter, extracting a pixel having a relatively small value in a local region and generating an image subjected to the region enlargement process using a value of the extracted pixel.

* * * * *